(12) United States Patent
Aasen

(10) Patent No.: US 11,868,108 B2
(45) Date of Patent: Jan. 9, 2024

(54) ARTIFICIAL WEATHERING OF A MULTI-DIMENSIONAL OBJECT

(71) Applicant: Volvo Car Corporation, Gothenburg (SE)

(72) Inventor: HansPetter Aasen, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 155 days.

(21) Appl. No.: 17/361,991

(22) Filed: Jun. 29, 2021

(65) Prior Publication Data
US 2022/0413525 A1  Dec. 29, 2022

(51) Int. Cl.
*G05B 19/042* (2006.01)
*G01N 17/00* (2006.01)

(52) U.S. Cl.
CPC ......... *G05B 19/042* (2013.01); *G01N 17/002* (2013.01); *G01N 17/004* (2013.01);
(Continued)

(58) Field of Classification Search
CPC .... G01N 17/002; G01N 17/004; G01N 17/02; G01N 17/008; G01N 17/006
(Continued)

(56) References Cited

U.S. PATENT DOCUMENTS 2,547,367 A * 4/1951 Booth ................. G01N 33/367
236/78 A 3,084,454 A * 4/1963 Schueller ................. B64G 7/00
434/34
(Continued)

FOREIGN PATENT DOCUMENTS

| CN | 105424587 A | * | 3/2016 | |
| CN | 108387507 A | * | 8/2018 | ........... G01N 17/002 |

(Continued)

OTHER PUBLICATIONS

Espacenet Machine Translation of EP 2759826 A1 Which Originally Published On Jul. 30, 2014. (Year: 2014).*
(Continued)

*Primary Examiner* — David A. Rogers
(74) *Attorney, Agent, or Firm* — Amin, Turocy & Watson, LLP

(57) ABSTRACT

One or more systems, devices, apparatus, computer-implemented methods, and/or system-implemented methods are provided that can facilitate artificial weathering of an object. In one example, an artificial weathering system can comprise a radiation generator configured to apply a constant radiation level to one or more surfaces of an object, and a controller configured to individually control a surface temperature at the one or more surfaces during the irradiation. The controller can be configured to maintain an ambient temperature range, that would be observed in a non-artificial environment, of a chamber containing the object during the irradiation. In another example, an artificial weathering system can comprise a controller configured to control an effect of radiation received at one or more surfaces of an object by controlling airflow directed towards the one or more surfaces, where the airflow is controlled based upon a surface temperature at the one or more surfaces.

20 Claims, 11 Drawing Sheets

(52) U.S. Cl.
CPC ............. *G05B 2219/23445* (2013.01); *G05B 2219/2637* (2013.01)

(58) Field of Classification Search
USPC ...................................................... 73/865.6
See application file for complete search history.

(56) References Cited

U.S. PATENT DOCUMENTS

| | | | | |
|---|---|---|---|---|
| 3,813,215 | A * | 5/1974 | Ward .................... | G01N 17/00 432/5 |
| H229 | H * | 3/1987 | Phillips ................ | G01N 17/002 374/134 |
| 4,779,468 | A * | 10/1988 | Susuki ................... | G01N 17/00 73/865.6 |
| 4,794,804 | A * | 1/1989 | Ishii ...................... | G01N 17/00 73/865.6 |
| 4,799,390 | A * | 1/1989 | Kimura ............... | G01M 17/007 73/865.6 |
| 4,847,790 | A * | 7/1989 | Suzuki ................ | G01M 17/007 700/282 |
| 4,964,298 | A * | 10/1990 | Matsushita ........... | G01M 15/02 73/116.01 |
| 5,138,892 | A * | 8/1992 | Suga .................... | G01N 17/004 374/57 |
| 5,220,840 | A * | 6/1993 | Neigoff ................ | G01N 17/004 250/252.1 |
| 5,226,318 | A * | 7/1993 | Huber .................. | G01N 17/004 73/159 |
| 5,574,226 | A * | 11/1996 | Reuther ................ | G01M 17/04 73/865.6 |
| 5,898,816 | A * | 4/1999 | Heeger ................. | G01N 17/004 73/87 |
| 6,023,985 | A * | 2/2000 | Fournier ............. | G01N 33/0062 73/865.6 |
| 6,073,500 | A * | 6/2000 | Jorgensen ............ | G01N 17/004 374/57 |
| 6,332,370 | B1 * | 12/2001 | Fukai .................... | G01N 25/68 73/865.6 |
| 6,525,493 | B2 * | 2/2003 | Grossman ............ | G01N 17/004 250/493.1 |
| 6,555,827 | B1 * | 4/2003 | Kockott ............... | G01N 17/004 250/492.1 |
| 6,626,052 | B1 * | 9/2003 | Martin ................. | G01N 21/474 73/865.6 |
| 6,659,638 | B1 * | 12/2003 | Hardcastel, III ......... | G01N 3/60 374/57 |
| 6,690,174 | B2 * | 2/2004 | Sigwart ............... | G01M 99/002 324/501 |
| 6,820,509 | B2 * | 11/2004 | Lewandowski ...... | G01N 17/004 359/853 |
| 6,889,179 | B2 * | 5/2005 | Chang .................. | G01N 17/002 703/6 |
| 7,013,742 | B2 * | 3/2006 | Beraud ................ | G01N 33/442 374/45 |
| 7,043,974 | B2 * | 5/2006 | Grossman ............ | G01N 17/002 73/159 |
| 7,101,068 | B2 * | 9/2006 | Soga ...................... | G01M 11/00 362/547 |
| 7,124,651 | B2 * | 10/2006 | Ketola ................. | G01N 17/004 445/6 |
| 7,127,958 | B2 * | 10/2006 | Blewett ............... | G01M 17/007 73/865.9 |
| 7,222,548 | B2 * | 5/2007 | Wass .................... | G01N 17/004 73/159 |
| 7,318,672 | B2 * | 1/2008 | Hardcastle, III ...... | G01N 17/002 374/57 |
| 7,353,722 | B2 * | 4/2008 | Schonlein ............. | G01N 17/00 702/135 |
| 7,368,730 | B2 * | 5/2008 | Schonlein ................ | G01J 1/08 250/493.1 |
| 7,454,990 | B2 * | 11/2008 | Hardcastle, III ...... | G01N 17/004 374/45 |
| 7,544,948 | B2 * | 6/2009 | Schonlein ............ | H05B 47/105 250/372 |
| 7,954,366 | B2 * | 6/2011 | Gushman .............. | G01M 15/02 73/116.01 |
| 8,225,682 | B2 * | 7/2012 | Schultz ................ | G01N 17/004 356/243.1 |
| 8,670,938 | B2 * | 3/2014 | Hardcastle, III ...... | G01N 17/002 702/3 |
| 9,063,050 | B2 * | 6/2015 | Suga .................... | G01N 17/004 |
| 9,151,511 | B2 * | 10/2015 | Jin ........................... | F24F 11/46 |
| 9,528,927 | B2 * | 12/2016 | Rudolph .............. | G01N 17/002 |
| 9,709,480 | B2 * | 7/2017 | Rudolph .............. | G01N 17/004 |
| 9,791,363 | B2 * | 10/2017 | March .................. | G01N 17/004 |
| 9,921,145 | B2 * | 3/2018 | Hein .................... | G01N 21/251 |
| 10,180,391 | B2 * | 1/2019 | Rey ..................... | G01M 5/0091 |
| 11,460,393 | B2 * | 10/2022 | Kent .................... | G01N 17/002 |
| 2005/0121605 | A1 * | 6/2005 | Rathod ................ | G01N 17/004 250/252.1 |
| 2006/0254372 | A1 * | 11/2006 | Scott ..................... | G01N 17/002 73/865.6 |
| 2007/0051906 | A1 * | 3/2007 | Brennan ............... | G01N 17/002 250/504 R |
| 2008/0156120 | A1 * | 7/2008 | D'Ambrosio ........ | G01N 17/004 73/865.6 |
| 2010/0005911 | A1 * | 1/2010 | Scott ..................... | G01N 21/25 356/402 |
| 2012/0268912 | A1 * | 10/2012 | Minami ............... | G01N 17/004 362/293 |
| 2015/0224854 | A1 * | 8/2015 | Muller ................. | G01N 17/002 422/53 |
| 2017/0307493 | A1 * | 10/2017 | Wang ................... | G01N 17/002 |
| 2019/0339192 | A1 * | 11/2019 | Ohnuma .............. | G01N 17/002 |
| 2022/0365124 | A1 * | 11/2022 | Hagi ...................... | G01R 31/003 |

FOREIGN PATENT DOCUMENTS

| | | | | |
|---|---|---|---|---|
| CN | 109323983 | A * | 2/2019 | |
| CN | 110160945 | A * | 8/2019 | |
| CN | 111879693 | A * | 11/2020 | .......... G01N 17/002 |
| CN | 112881271 | A * | 6/2021 | .......... G01M 17/007 |
| DE | 10155245 | B4 * | 12/2004 | .......... G01M 17/007 |
| EP | 2759826 | A1 * | 7/2014 | .......... G01N 17/002 |
| EP | 3133382 | B1 * | 8/2018 | ............ G01M 13/00 |

OTHER PUBLICATIONS

Espacenet Machine Translation of CN 109323983 A Which Originally Published On Feb. 12, 2019. (Year: 2019).*
"Have You Put Your Vehicle To The Test?", Atlas Material Testing Solutions, 2015. (Year: 2015).*
"Plastics—Methods of exposure to laboratory light sources," British Standard, BS EN ISO 4892-1:2001, 23 pages.
"Ageing Automobile Components in Solar Simulation Units," DIN 75 220, Nov. 1992, 19 pages.
"Plastics—Methods of exposure to laboratory light sources," British Standard, BS EN ISO 4892-1:2016(E), 11 pages.

* cited by examiner

ARTIFICIAL WEATHERING OF A MULTI-DIMENSIONAL OBJECT

TECHNICAL FIELD

One or more embodiments described herein relate to artificial weathering of an object, and more specifically, to artificial weathering of a multi-dimensional object by employing individual surface temperature control.

BACKGROUND

Artificial weathering can be employed to simulate how an object and the associated materials, structure, coloring, texture, assembly and/or functionality will fare when exposed to actual environmental and/or use conditions. Artificial weathering can be conducted using a reduced timeframe as compared to actual weathering and/or use of the object in real time. That is, artificial weathering can simulate outdoor exposure to direct and/or indirect visible light, UV radiation, infrared radiation (e.g., heat), moisture and/or other climatic stresses. Nonetheless, correlating one or more results and/or effects of artificial weathering to one or more results and/or effects from one or more actual-use conditions can be difficult.

SUMMARY

The following presents a summary to provide a basic understanding of one or more embodiments described herein. This summary is not intended to identify key or critical elements, or to delineate any scope of the particular embodiments and/or any scope of the claims. The sole purpose of the summary is to present concepts in a simplified form as a prelude to the more detailed description that is presented later. In one or more embodiments described herein, devices, apparatuses, systems, computer-implemented methods, system-implemented methods and/or computer program products are described that can facilitate artificial weathering of an object.

Systems constructed for artificial weathering typically focus on accurately and artificially reproducing a non-artificial environment. Such systems typically employ one or more techniques to artificially simulate changing radiation received by an object from the sun and/or changing environmental conditions, such as ambient temperature, moisture and/or airflow. Nonetheless, these one or more techniques can result in one or more inaccurate effects from a surface-to-surface standpoint when artificially weathering a multi-dimensional object, such as a vehicle, having multiple surfaces. Such existing techniques, while possibly providing results and/or effects that can correlate to an object as a whole, can fail to produce results and/or effects that can correlate well across various individual surfaces and/or groups of surfaces of the object.

Indeed, during actual-use exposure to a non-artificial environment, a multi-dimensional object can observe differentiated temperatures at various exterior surfaces, based on a combination of sun radiation, ambient temperature, wind-condition, object shape, object material and/or object coloring. For example, surfaces being angled differently from one another can not only observe such different temperatures at a single point in time, but such differences can continue to vary over a course of a day based on changing weather and/or position of the sun in the sky relative to the object. That is, the inventor has observed that when artificially simulating outdoor exposure conditions in an artificial setting, it can be less than sufficient to control only radiation level and/or ambient temperature to enable accurate replication of exposure effects on multi-dimensional objects.

To account for one or more of these issues and/or concerns, subject matter described herein includes one or more embodiments that can employ one or more various techniques to artificially weather a multi-dimensional object, such as in a manner that can produce one or more results and or effects that can correlate to one or more results and/or effects of one or more actual-use conditions. Employing such one or more techniques, individual surface temperature control can be provided, such as including a timed temperature build-up. One or more differentiated surface temperatures from non-artificial exposure, such as caused by variations of air exchange at differently angled surfaces, can be replicated in an artificial weathering process. In this way, artificial temperature control for individual surfaces can be correlated to actual outdoor (e.g., non-artificial) exposure, such as by using actual temperature data from outdoor exposure as input for the artificial weathering process.

According to an embodiment, an artificial weathering system can comprise a radiation generator configured to apply a constant radiation level to one or more surfaces of an object, and a controller configured to individually control a surface temperature at the one or more surfaces during the irradiation.

According to another embodiment, an artificial weathering system can comprise a controller configured to control an effect of radiation received at one or more surfaces of an object by controlling airflow directed towards the one or more surfaces, where the airflow is controlled based upon a surface temperature at the one or more surfaces.

According to yet another embodiment, a method of employing an artificial weathering system to artificially weather an object can comprise applying, by the system, a constant radiation level to one or more surfaces of an object, and individually controlling, by the system, a surface temperature at the one or more surfaces during the irradiation.

In one or more of the above-provided embodiments, one or more airflow generators can be controlled by the controller to individually modify the surface temperature at the one or more surfaces.

In one or more of the above-provided embodiments, the radiation generator can be configured to simultaneously apply the constant radiation level to two or more of the one or more surfaces.

In one or more of the above-provided embodiments, the controller can be further configured to simultaneously individually control a surface temperature at two or more of the one or more surfaces.

These one or more embodiments can accordingly provide at least one or more of simultaneous multi-surface artificial weathering, individual control of artificial weathering at two or more surfaces, and/or artificial weathering closely correlating to weathering in an actual-use environment.

For example, individual control of artificial weathering at two or more surfaces can be provided by employing individual tracking of temperatures at individual surfaces during irradiation and by individually responding to these temperatures. Individual response can be provided such as employing a plurality of airflow generators with different airflow generators generating airflow directed toward different surfaces of the one or more surfaces. The one or more individual responses can enable individual control of the temperatures at the individual surfaces, in response to the temperature tracking.

In view of the one or more techniques employed by the one or more above-provided embodiments, accuracy of individual surface weathering results relative to one another can be improved (e.g., enhanced and/or optimized). This is because the one or more techniques can enable close correlation to actual-use individual surface weathering results. Individual responses targeted relative to individual surfaces, as opposed to globally (e.g., overall) altering radiation levels and/or ambient temperature, can enable individual weathering effects to artificially occur, which artificial effects can correlate to actual-use weather effects. That is, multiple surfaces of a multi-dimensional object can be simultaneously artificially weathered. Additionally and/or alternatively, in one or more embodiments, one or more supplementary interpolations of artificial weathering effects, and the error inherent therein, can be omitted, such as relative to one or more primary surfaces. Instead, individual surface weathering control can be provided.

DESCRIPTION OF THE DRAWINGS

One or more exemplary embodiments are described below in the Detailed Description section with reference to the following drawings.

DETAILED DESCRIPTION

Figure 1:
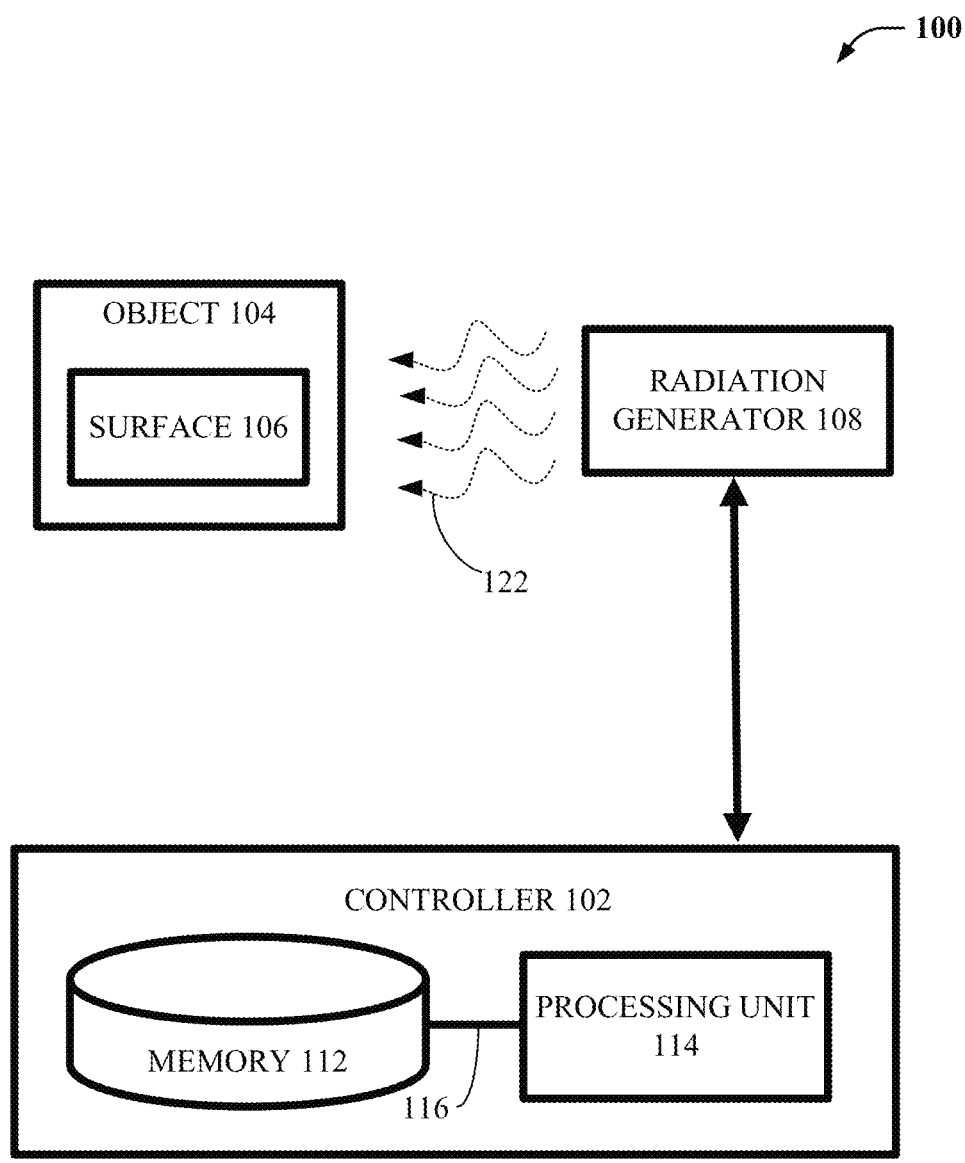
FIG. 1 illustrates a block diagram of an example, non-limiting system that can facilitate artificial weathering of an object, in accordance with one or more embodiments described herein.

The following detailed description is merely illustrative and is not intended to limit embodiments and/or application or uses of embodiments. Furthermore, there is no intention to be bound by any expressed and/or implied information presented in the preceding Background and/or Summary sections, and/or in this Detailed Description section.

To account for one or more issues with the use of artificial weathering for determining weathering results and/or effects at different individual surfaces and/or surface groups of a multi-dimensional object, one or more embodiments described herein can be employed. Such artificial weathering system can be employed to simultaneously artificially weather multiple surfaces of a multi-dimensional object, with differentiated effects resulting at different ones of the multiple surfaces and/or surface groups. The artificial weathering system can provide such results by employing individual temperature control at the different surfaces and/or surface groups. The individual temperature control can be based on actual-use data as an input.

It will be appreciated that while one or more artificial weathering systems are described below with reference to weathering of a vehicle, and even a wheeled vehicle, such as an automobile, the one or more embodiments described herein are not limited to this use. Indeed, the one or more artificial weathering systems described herein can be utilized with any of a military vehicle, marine vehicle such as a boat or marine drone, winged vehicle such as a plane, and/or rotor-ed vehicle such as a helicopter or drone. Likewise, usage can extend to one or more separate components, assemblies, sub-assemblies and/or other aspects. Additionally and/or alternatively, more than one object can be artificially weathered at a time, such as at least partially in parallel with one another. This multi-object artificial weathering can be facilitated by the one or more artificial weathering systems described herein with reference to a same and or different artificial weather chambers, also referred to herein simply as "chambers".

One or more various entities can facilitate control of and/or setup of the artificial weathering. As used herein, the term "entity" can comprise a machine, device, hardware, software, computing device and/or human. As indicated, it will be appreciated that such entity can facilitate implementation of the subject matter disclosed herein in accordance with one or more embodiments described herein.

One or more of these embodiments are now described with reference to the figures, where like referenced numerals are used to refer to like elements throughout. In the following description, for purposes of explanation, numerous specific details are set forth in order to provide a more thorough understanding of the one or more embodiments. It is evident in one or more cases, however, that the one or more embodiments can be practiced without these specific details.

Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems 100, 200 and/or 300 illustrated at FIGS. 1, 2 and/or 3, respectively, can further comprise one or more computer and/or computing-based elements described herein with reference to an operating environment, such as the operating environment 900 illustrated at FIG. 9. In one or more described embodiments, computer and/or computing-based elements can be used in connection with implementing one or more of the systems, devices, components and/or computer-implemented operations shown and/or described in connection with FIGS. 1, 2 and/or 3 and/or with one or more other figures described herein.

Turning first to FIG. 1, one or more embodiments described herein can include one or more systems, computer-implemented methods, apparatuses and/or computer program products that can facilitate artificial weathering of a multi-dimensional object. For example, FIG. 1 illustrates a block diagram of an example, non-limiting system 100 (e.g., artificial weathering system) that can facilitate artificial weathering relative to a scalable, such as a large, quantity of surfaces 106 of a multi-dimensional object 104, in accordance with one or more embodiments described herein. Non-limiting system 100 can include at least a controller 102 and a radiation generator 108 for acting on the object 104.

Generally, the radiation generator 108 can be configured to apply radiation 122 at a constant radiation level to one or more surfaces 106 of the object 104. For example, the radiation generator 108 can comprise global radiation generator, UV radiation generator, infrared generator and/or the like. Output such as radiation from the radiation generator 108 can be directed indirectly and/or directly towards the object 104.

The controller 102 can be generally configured to individually control a surface temperature at the one or more surfaces 106 of the object 104. The controller 102 can comprise at least a memory 112 and processing unit 114 communicatively connected to one another via a bus 116. It will be appreciated that one or more descriptions provided below relative to a memory, processing unit and/or bus can apply equally to the memory 112, processing unit 114 and/or bus 116. For example, functionality of one or more controller components will be covered in greater detail below.

The individual temperature control can be facilitated via one or more techniques, such as surface temperature measurement, airflow generation, baffle implementation and/or use of one or more reflective surfaces. The controller 102 can be communicatively connected to one or more devices, systems, assemblies, apparatuses and/or computers for this facilitation.

By the controller 102 individually controlling an individual temperature at one or more individual surfaces (e.g., a temperature per surface of one or more surfaces), differentiated artificial weathering results can be obtained relative to the one or more different surfaces 106. Further, constant radiation generation can be employed by the radiation generator 108, such as at a constant level, absent varying of the radiation level. Indeed, varying the radiation level can produce inconsistently differentiated results relative to positioning of a multi-dimensional object relative to a respective radiation generator. That is, by instead targeting individual surfaces for individual temperature control, differentiated results can be more accurately provided that can better correlate to differentiated actual-use weathering at such individual surfaces.

Figure 2:
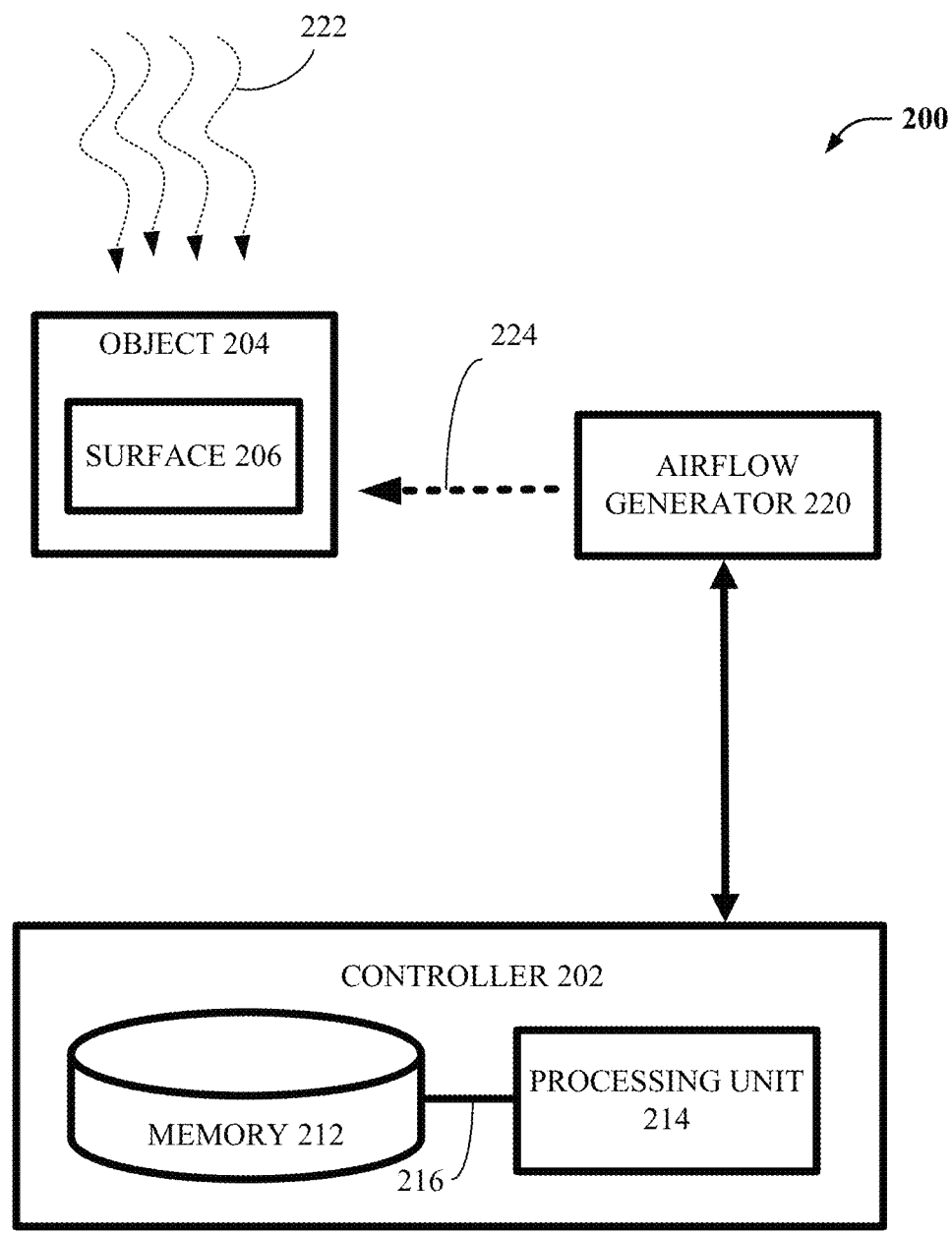
FIG. 2 illustrates another block diagram of another example, non-limiting system that can facilitate artificial weathering of an object, in accordance with one or more embodiments described herein.

Turning now to FIG. 2, illustrated is another block diagram of an example, non-limiting system 200 that can facilitate artificial weathering of a multi-dimensional object, in accordance with one or more embodiments described herein. The non-limiting system 200 is substantially similar to the non-limiting system 100, except as described below. Elements of the non-limiting system 200 that are similar to the non-limiting system 100 are identified by like reference numerals but offset by 100. One or more elements of the non-limiting system 100 can be used with the non-limiting system 200 or vice versa, where suitable.

The non-limiting system 200 can facilitate artificial weathering relative to a scalable, such as a large, quantity of surfaces 206 of a multi-dimensional object 204, in accordance with one or more embodiments described herein. Non-limiting system 200 includes at least a controller 202 and airflow generator 220 for acting on the object 104.

Generally, the airflow generator 220 can be configured to generate airflow 224 and to direct the airflow 224 towards the object 204. The airflow generator 220 can comprise a fan, blower and/or other device capable of generating airflow.

Radiation 222 can be applied to the object 204 to cause artificial weathering of the object 204, such as of the one or more surfaces 206. While not shown, the radiation 222 can be supplied and/or generated by a suitable method, such as by a radiation generator. The radiation 222 can comprise one or more of global radiation, UV radiation and/or infrared radiation.

The controller 202 can comprise at least a memory 212 and processing unit 214 communicatively connected to one another via a bus 216. It will be appreciated that one or more descriptions provided below relative to a memory, processing unit and/or bus can apply equally to the memory 212, processing unit 214 and/or bus 216. For example, functionality of one or more controller components will be covered in greater detail below.

The controller 202 can be generally configured to control an effect of radiation 222 received at one or more surfaces 206 of the object 204 by controlling the airflow 224 directed towards the one or more surfaces 206. The airflow 224 can be controlled by the controller 202 based upon a surface temperature at the one or more surfaces 206. For example, the controller 202 can dynamically control a status of the airflow generator 220, such as turning on/off, cycling and/or varying airflow. In one or more embodiments, the controller 202 can be capable of moving the airflow 224, with the airflow generator 220 being capable of one or more degrees of movement.

This control can be based upon a surface temperature at the one or more surfaces 206. That is, it will be appreciated that the controller 202 can monitor and/or respond to monitoring of a temperature at a surface 206. Likewise, the controller 202 and/or the non-limiting system 200 can be configured to monitor individual temperatures at more than one surface 206 of the multi-dimensional and multi-surface object 204. The individual temperature(s) can be monitored in any suitable manner, such as including a thermometer employing any suitable material and/or method, such as, but not limited to, chemical, material, light and/or laser.

That is, individual effects of radiation at the one or more surfaces 206 can be controlled by the controller 202. This control can be facilitated absent dynamic global radiation control over the whole of the object 204. Rather, by individually controlling an individual temperature at one or more individual surfaces (e.g., a temperature per surface of one or more surfaces), differentiated artificial weathering results can be obtained relative to the one or more different surfaces 206. That is, receipt of radiation at the one or more surfaces 206 can be constant and non-interrupted, while instead employing airflow generation to dynamically control and/or partially limit an effect of the radiation at the one or more surfaces 206.

These one or more artificial weathering techniques can enable differentiated results that can better correlate to differentiated actual-use weathering at such individual surfaces. For example, in an actual-use environment, radiation received at a surface can typically be majoratively non-changing, in that our sun does not have on and off status. Nonetheless, radiation received can be varied and/or at least partially interrupted. That is, in one or more cases, a majority of radiation received in an outdoor environment can be due to direct exposure from the sun, with a lesser portion received indirectly from reflection, refraction and/or the like. Further, in one or more cases, while clouds and/or objects can vary an effect of radiation, such radiation still can be received. Accordingly, the non-limiting system 200 can provide differentiation to the artificial weathering at one or more individual surfaces 206 that can correlate to actual-use, such as by controlling the temperature at an individual surface, such as can naturally be affected such as by wind, clouds and/or other aspects.

Figure 3:
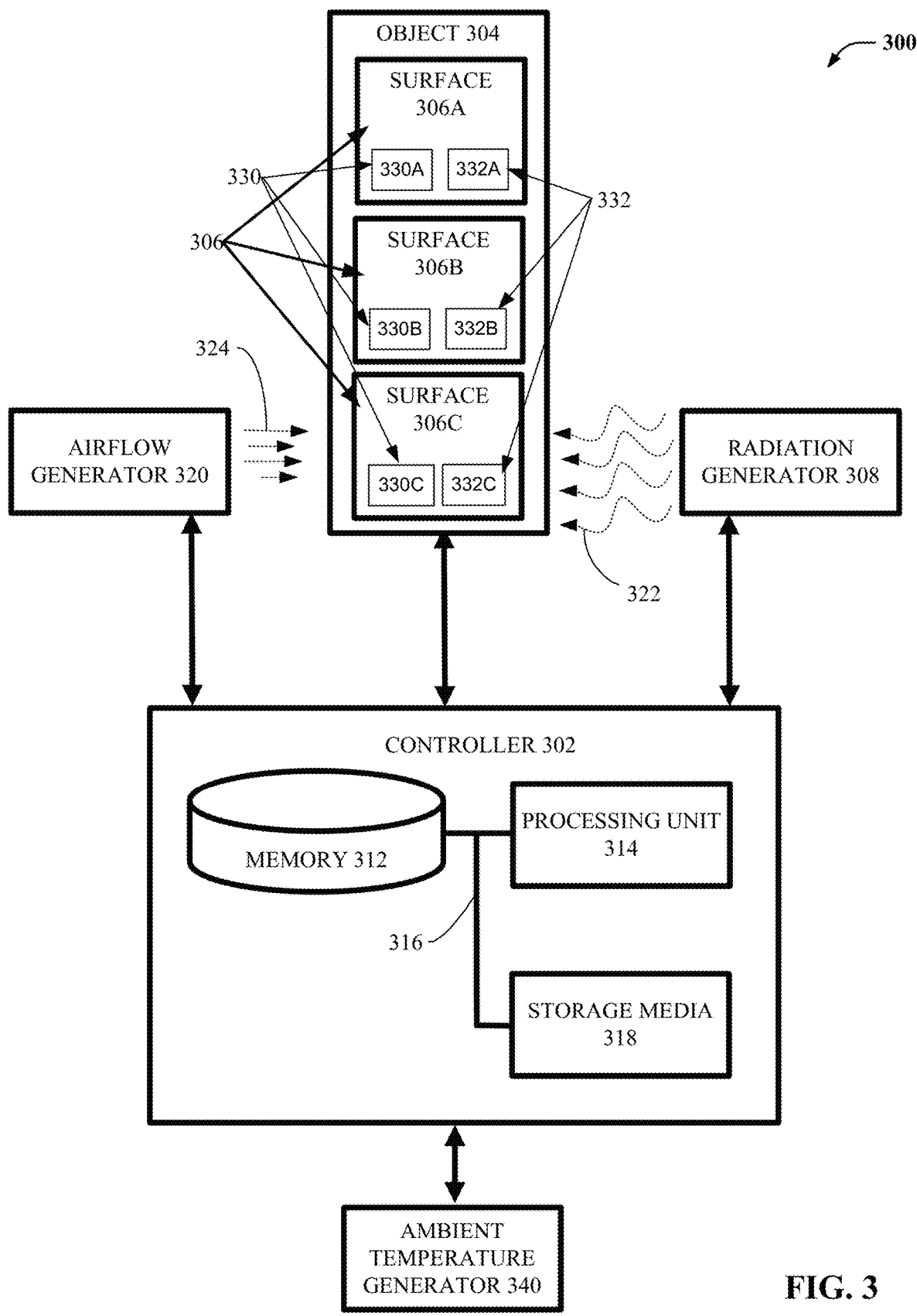
FIG. 3 illustrates yet another block diagram of an example, non-limiting system that can facilitate artificial weathering of an object, in accordance with one or more embodiments described herein.

FIG. 3 illustrates still another block diagram of an example, non-limiting system 300 that can facilitate artificial weathering of a multi-dimensional object, in accordance with one or more embodiments described herein. The non-limiting system 300 is substantially similar to the non-limiting systems 100 and 200, except as described below. Elements of the non-limiting system 300 that are similar to the non-limiting systems 100 and 200 are identified by like reference numerals but offset by 200 and 100, respectively. One or more elements of the non-limiting systems 100 and 200 can be used with the non-limiting system 300 or vice versa, where suitable.

The non-limiting system 300 can facilitate artificial weathering relative to a scalable, such as a large, quantity of surfaces 306 of a multi-dimensional object 304, in accordance with one or more embodiments described herein. Non-limiting system 300 can include at least a controller 302, radiation generator 308, airflow generator 320 and/or ambient temperature generator 340 for acting directly and/or indirectly on the object 304. Generally, the non-limiting system 300 can facilitate artificial weathering by employing the radiation generator 308 to apply a constant radiation level to the one or more surfaces 306, while the controller can be configured to individually control a surface temperature at the one or more surfaces 306 during the irradiation.

The one or more aspects illustrated at FIG. 3 will now be described in detail. It will be appreciated that the object 304 can be included in the non-limiting system 300 and/or considered separate from the non-limiting system 300.

Looking first to the object 304, included can be a plurality of individual surfaces 306, such as individual surfaces 306A, 306B and 306C. It will be appreciated that the surfaces 306A-306C can be differently sized, colored, angled, shaped and/or located relative to one another. The surfaces 306A-306C can include the same and/or different materials and/or coatings. One or more of the surfaces 306A-306C can represent a group of two or more surfaces. As used herein, a surface can have a varying contour and/or one or more shapes and/or angles. That is, a surface 306A-306C can be planar and/or non-planar.

In one or more embodiments, an entity, such as employing the controller 302, can determine one or more delineations, divisions and/or separations at the external surface of the object 304, to thereby define the one or more surfaces 306. The controller 302 can employ one or more views and/or renderings of the object 304 to facilitate the separation.

Generally, one or more temperature sensors can be disposed at the one or more surfaces 306 and can be communicatively connected to the controller 302. For example, one or more of these surfaces 306A-306C can have associated therewith one or more temperature measurement devices 330 and/or 332, such as temperature sensors. As shown, one or more, such as each, of the surfaces 306A-306C can have in direct and/or indirect contact therewith one or more black standard thermometers. As illustrated, one or more, such as each, surface 306A-306C can have in contact therewith a test temperature measurement device 330A-330C and a control temperature measurement device 332A-332C. For example, surface 306A can have on the surface 306A a test temperature measurement device 330A and a control temperature measurement device 332A. The temperature measurement devices 330 and 332 can be aligned generally adjacent one another at the respective surfaces 306A-306C.

In one or more embodiments, an entity, such as employing the controller 302, can determine one or more locations at the external surface of the object 304 for locating the one or more temperature measurement devices 330 and 332. The controller 302 can employ one or more views and/or renderings of the object 304 to facilitate the locating. In an embodiment, one or more robotic arms, robots and/or other devices (not shown) can be controlled by the controller 302 for placement of the one or more temperature measurement devices 330 and 332 at the one or more surfaces 306.

As employed by the controller 302, the test temperature measurement devices 330A-330C can be monitored at any suitable interval, such as via a communicative connection to the controller 302, and the one or more results (e.g., one or more temperatures) can be employed to effect individual temperature control at the individual surfaces 306A-306C. The control temperature measurement devices 332A-332C can be monitored at any suitable interval, such as via a communicative connection to the controller 302, or, in an embodiment, the control temperature measurement devices can be non-monitored. That is, the one or more control temperature measurement devices 332 can serve as baselines and/or controls.

The test temperature measurement devices 330A-330C and the control temperature measurement devices 332A-332C can be any suitable temperature measurement devices. In one or more embodiments, black standard thermometers and/or other industry-standard thermometer (e.g., relative to the particular object 304) can be employed.

As indicated, the test temperature measurement devices 330A-330C and the control temperature measurement devices 332A-332C can be communicatively connectable to the controller 302 and/or other aspect of the non-limiting system 300. It will be appreciated that one or more results from one or more of the temperature measurement devices 330 and/or 332 can be stored, such as via the controller 302, at the controller 302 and/or at any other suitable location external to the controller 302 but directly and/or indirectly accessible by and/or to the controller 302 and/or the non-limiting system 300.

Turning next to the controller 302, as shown by FIG. 3, the controller 302 can comprise at least a memory 312 and a processing unit 314 communicatively connected to one another via a bus 316. The controller 302 can be portable and/or fixed relative to an artificial weathering location of the object 304.

The processing unit 314 can be any of various available processors. One or more dual microprocessors and/or other multiprocessor architectures can be employed at and/or as the processing unit 314. A processor can employ distributed and/or federated machine intelligence, which can be employed to operate and/or facilitate one or more computer-readable program instructions.

The bus 316 can include any one or more of various types of bus structure(s) including a memory bus, memory controller, peripheral bus, external bus and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094) and/or Small Computer Systems Interface (SCSI).

The system memory 312 can include volatile memory and/or nonvolatile memory. A basic input/output system (BIOS), containing one or more basic routines to transfer information between elements within the non-limiting system 300, such as during activation of the non-limiting system 300, can be stored in a nonvolatile memory. By way of illustration, and not limited thereto, nonvolatile memory can include read only memory (ROM), programmable ROM (PROM), electrically programmable ROM (EPROM), electrically erasable programmable ROM (EEPROM), flash memory and/or nonvolatile random-access memory (RAM) (e.g., ferroelectric RAM (FeRAM)). Volatile memory can include random access memory (RAM), which can act as external cache memory. By way of illustration, and not limited thereto, RAM can be available in any one or more forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM.

In one or more embodiments, the non-limiting system 300 can include removable and/or non-removable, volatile and/or non-volatile computer storage media 318, such as a disk storage, which can be connected to the bus 316. A disk storage can include, but is not limited to, a device such as a magnetic disk drive, floppy disk drive, tape drive, Zip drive, LS-100 drive, flash memory card, memory stick, optical disk drive such as for a compact disk ROM device (CD-ROM), CD recordable drive (CD-R Drive), CD rewritable drive (CD-RW Drive) and/or digital versatile disk ROM drive (DVD-ROM).

The non-limiting system 300 can operate in a networked environment, such as a cloud network, using logical connections to one or more remote computers, such as remote computer(s). The remote computer(s) can include a computer, server, router, network PC, workstation, microprocessor-based appliance, peer device and/or other common network node and/or the like. For example, the controller 302 can be located onsite with the object 304 and/or located offsite.

The controller 302 can be employed, such as via communicative connection therewith, to control operation of any one or more of the radiation generator 308, airflow generator 320 and/or ambient temperature generator 340. The controller 302 further can be employed to control any one or more additional functions associated with artificial weather performed by the non-limiting system 300. In one or more embodiments, the controller 302 can employ machine learning and/or artificial intelligence. For example, positioning and/or operation of one or more of the radiation generator 308, airflow generator 320 and/or ambient temperature generator 340 can be adjusted between runs, programs, simulations and/or the like of the non-limiting system 300, such as by employing data obtained by the controller 302 from one or more previous runs, programs, simulations and/or the like.

It will be appreciated that in one or more other embodiments, control of any one or more of the radiation generator 308, airflow generator 320 ambient temperature generator 340 and/or any other aspect of the non-limiting system 300 can additionally and/or alternatively be controlled by another controller and/or entity, such as a computer employing artificial intelligence. The another controller can be included in the non-limiting system 300 and/or can be separate therefrom. The another controller can be located onsite with the object 304 and/or located offsite.

Turning now to the one or more generators illustrated at FIG. 3, the radiation generator 308 can be configured to be controlled, such as by the controller 302, to apply radiation 322 at a constant radiation level to the one or more surfaces 306A-306C of the object 304 to facilitate artificial weathering of and/or at the one or more surfaces 306A-306C. That is, the radiation generator 308 can be configured, such as via a construction, shape and/or one or more output structures, to simultaneously apply the constant radiation level to two or more of the one or more surfaces 306A-306C. For example, the radiation generator 308 can comprise a global radiation generator, UV radiation generator, infrared generator and/or the like. Output such as radiation from the radiation generator 308 can be directed indirectly and/or directly towards the object 304.

The radiation generator 308 can be configured to be controlled, such as by the controller 302, to uniformly apply the constant radiation level to two or more of the one or more surfaces 306A-306C. For example, the radiation generator 308 can include one or more sub-generators, output structures, baffles and/or output orifices to direct radiation at two or more, such as each, of the one or more surfaces 306A-306C. Additionally and/or alternatively, uniform radiation application can be facilitated via positioning and/or distance of the generator from the various surfaces 306A-306C. In an embodiment, the positioning of the radiation generator 308 can be facilitated by the controller 302, such as employing one or more views and/or renderings of the object 304 to facilitate the positioning.

The airflow generator 320 can be configured to generate airflow 324 and to direct the airflow 324 towards the object 304. The airflow generator 320 can comprise one or more fan, blower and/or other device capable of generating airflow.

One or more airflow generators 320 can be included in the non-limiting system 300 and can be controlled by the controller 302 to individually modify the surface temperature at the one or more surfaces 306. As such, the controller 302 can be configured to control one or more separate airflows 324, such as via controlling running of the one or more airflow generators 320. In one or more embodiments, the controller 302 can be configured to modulate one or more airflows 324 between two or more states. For example, the controller 302 can modulate an airflow generator 320 between on and off states. In one or more other embodiments, more varied modulation can be employed by the controller 302, such as including two or more incremental airflow velocities and/or airflow patterns/shapes.

Employing the aforementioned one or more types of control of the one or more airflow generators 320, and/or the readings and/or results received and/or obtained from the one or more test temperature measurement devices 330, the controller 302 can be configured to simultaneously individually control a surface temperature at two or more of the one or more surfaces 306. Indeed, the controller 302 can be configured to control an effect of the radiation 322 received at the one or more surfaces 306, such as where the airflow 324 is controlled based upon a surface temperature at the one or more surfaces 306. For example, based on readings and/or results from the test temperature measurement devices 330, the controller 302 can determine selective airflow control of airflow 324 directed towards the one or more surfaces 306. That is, the controller 302 can utilize the airflow generator 320 to maintain an individual surface temperature at one or more sequential and varying temperature ranges, such as within a deviation enabled by the airflow generator 320 and/or control thereof.

Additionally and/or alternatively, the ambient temperature generator 340 can be employed, such as via control by the controller 302, to generate an ambient temperature about the object 304. In one embodiment, the ambient temperature generator 340 can be employed to maintain one or more sequential and varying ambient temperature ranges that would be observed in a non-artificial environment, such as during actual use of the object 304. That is, the controller 302 can employ actual-use data to determine the ambient temperature output by the ambient temperature generator 340.

Additional detail regarding use of actual-use data, historical data and/or machine learning/artificial intelligence for controlling any one or more of the radiation generator 308, airflow generator 320 and/or ambient temperature generator 340 will be further detailed below, with reference to a specific exemplary use of the non-limiting system 300.

Figure 4:
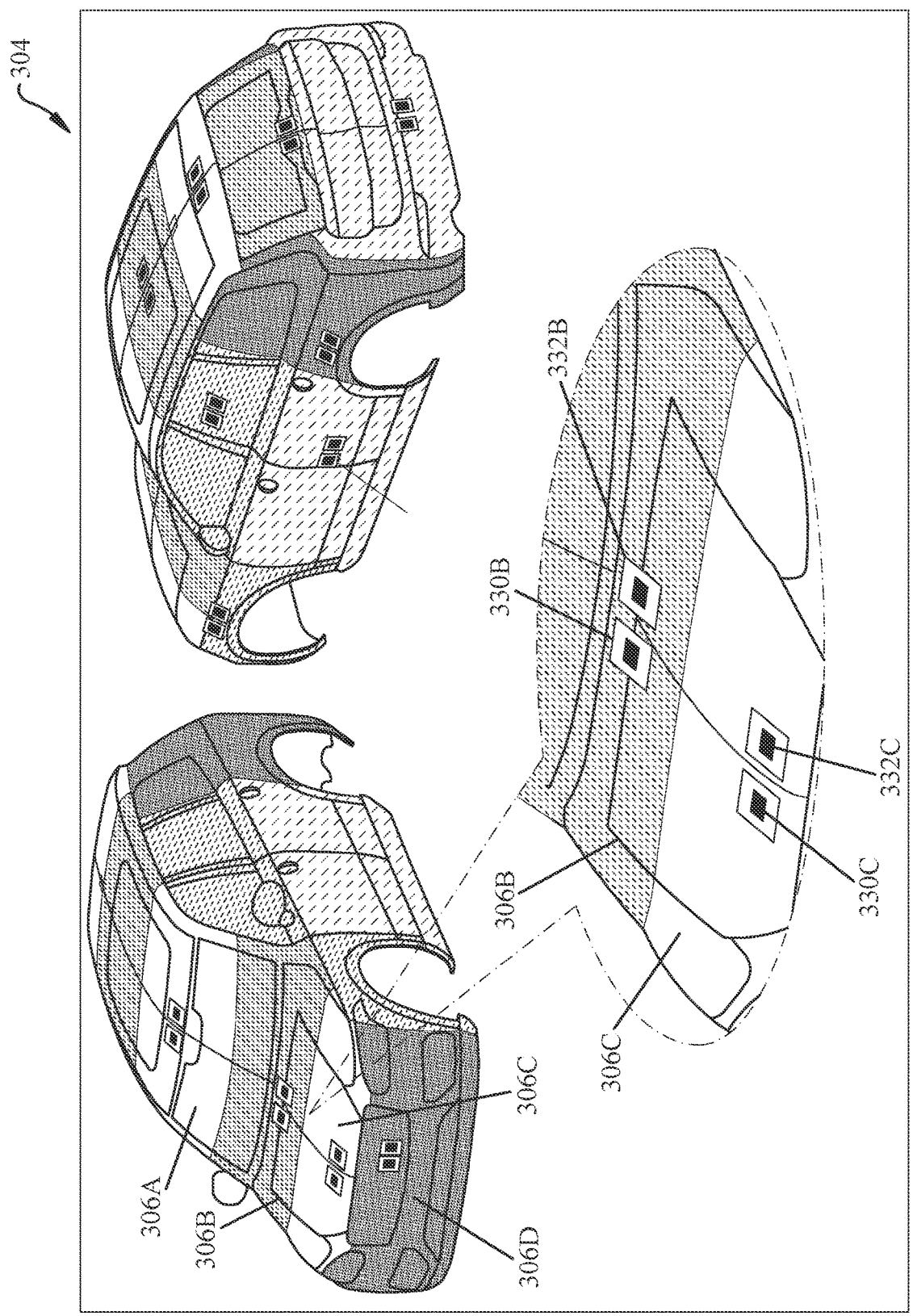
FIG. 4 illustrates various views of an object, being a vehicle, that can be artificially weathered employing the non-limiting system as illustrated of FIG. 3 that can facilitate artificial weathering of an object, in accordance with one or more embodiments described herein.

Turning now to FIG. 4 and to such specific exemplary use, the object 304 acted upon by the non-limiting system 300 can be a vehicle, such as a wheeled vehicle, car, hatchback, SUV, sedan and/or the like. FIG. 4 illustrates one or more views of such a vehicle. It will be appreciated that one or more functions and/or aspects discussed above with respect to the embodiment of FIG. 3 also can apply to the particular application illustrated at FIG. 4 and/or vice versa.

The vehicle illustrated at FIG. 4 can include the one or more surfaces 306A-306C and/or one or more additional surfaces 306D. As illustrated, one or more of the surfaces 306A-306D can have varying contours, shapes, materials, colors and/or angles relative to one another. One or more of the surfaces 306A-306D can represent a plurality of surfaces of the vehicle, such as of an external body of the vehicle. That is, the surfaces and/or groups of surfaces of the vehicle can be divided in any suitable manner, such as due to an industry standard and/or other logic.

Figure 5:
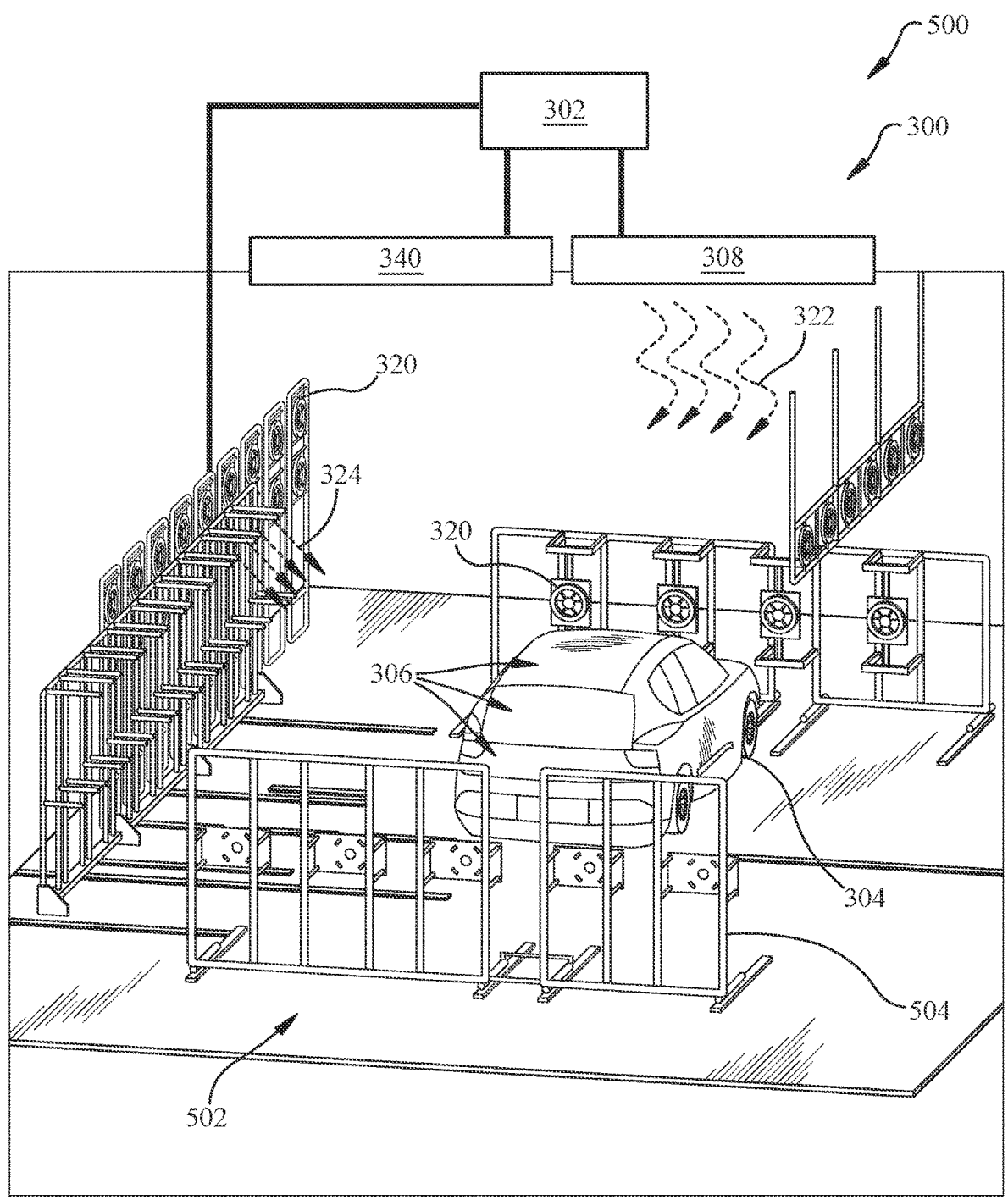
FIG. 5 illustrates a plurality of temperature collectives as used during artificial weathering of a vehicle employing the non-limiting system of FIG. 3 that can facilitate artificial weathering of an object, in accordance with one or more embodiments described herein.

Turning next to FIG. 5, an exemplary setup 500 is illustrated that can employ the non-limiting system 300 (e.g., artificial weathering system) to artificially weather a vehicle object 304.

As illustrated, the exemplary setup 500 can comprise the non-limiting system 300 having the radiation generator 308, one or more airflow generators 320 and ambient temperature generator 340 communicatively connected to the controller 302 and all positioned relative to a chamber 502. In one or more embodiments, fewer or additional airflow generators 320, different from that illustrated, can be included in the non-limiting system 300 and exemplary setup 500. In one or more embodiments, one or more additional radiation generators 308 and/or ambient temperature generators 340, beyond that illustrated, can be included in the non-limiting system 300 and exemplary setup 500.

In one or more embodiments, the chamber 502, such as a testing chamber, can be generally sealed and/or insulated to allow for better control of airflow within and/or ambient temperature of the chamber. As illustrated, one vehicle object 304 is disposed within the chamber 502. In one or more other embodiments, one or more additional objects, such as vehicle objects, also can be disposed within the chamber 502 to be at least partially artificially weathered in parallel with one another.

In general, artificial weathering of the vehicle object 304 can be provided by the non-limiting system 300 (e.g., artificial weathering system) to simulate actual-use exposure of the vehicle object 304 in an actual-use environment. In one or more embodiments, the non-limiting system 300 can be employed to test the one or more vehicle objects 304 for one or more results and/or effects of weathering in a time period that can be less than that observed during actual-use exposure. Indeed, the non-limiting system 300 can be employed to facilitate accelerated weathering, but with such artificial weathering having individual and/or differentiated results and/or effects observed relative to one or more individual surfaces 306 of the vehicle object 304.

To achieve the artificial weathering, one or more of position of the vehicle object 304, output from the radiation generator 308, output from the airflow generator 320, output from the ambient temperature generator 340, particular sets of temperature ranges (e.g., temperature collectives) employed by the controller 302 for individual surfaces, and/or length of time and/or cycling of an artificial weathering program can be selectively configured. The configuration(s) can facilitate artificial simulation of one or more results and/or effects at the one or more individual surfaces 306 that can correlate to one or more actual-use results and/or effects, but with being provided in a shorter time frame (e.g., test and/or experiment time frame).

Turning first to vehicle object 304 positioning within the chamber 502, the positioning can be jointly configured relative to positioning of one or more radiation generators 308, airflow generators 320 and/or ambient temperature generators 340, and relative to the chamber 502. The one or more relative positionings can be selectively determined by an administering entity to best provide one or more artificial weathering results and/or effects that correlate to one or more results and/or effects from actual-use weathering. For example, the controller 302 can employ one or more views and/or renderings of the object 304 and/or chamber 502 to facilitate the positioning(s).

The one or more radiation generators 308 can be generally positioned to enable the uniform application of radiation to the various individual surfaces 306 of the vehicle object 304. The one or more radiation generators 308 can be controlled by the controller 302 and/or by a separate controller to output a constant radiation level.

The one or more ambient temperature generators 340 can be generally positioned to enable the uniform heating/cooling of the chamber 502. The one or more ambient temperature generators 340 can be controlled by the controller 302 and/or by a separate controller. In one embodiment, the one or more ambient temperature generators 340 can be employed to maintain an ambient temperature range, that would be observed in a non-artificial environment, in the chamber 502 during the irradiation of the one or more surfaces 306. Actual-use ambient temperature data can be obtained in any suitable manner. In one embodiment, such actual-use data can be facilitated to simulate changing environmental ambient temperature over the course of a day in an actual-use environment, but instead with accelerated provision over a shorter time frame, such as one or more hours in the chamber 502. It will be appreciated that in one or more embodiments, ambient temperature can be regarded only as a reference, such as relative to the object 304 (e.g., vehicle) as a whole. For example, an ambient temperature can be generated and/or selectively varied to facilitate better control of the one or more individual temperatures and/or ranges that the controller 302 can function to maintain at the one or more individual surfaces 306.

Turning to the one or more airflow generators 320, such airflow generators 320 are illustrated as a plurality of fans that can be supported by a plurality of supports 504 in the chamber 502 of the exemplary setup 500. Based on the vehicle object 304, such as on the shape, contour and/or dimensioning of the vehicle object 304, the one or more separate airflows 324 can be separately directed towards one or more targeted ones of the one or more surfaces 306. Positioning of one or more airflow generators 320 can be selectively determined, preset, and/or dynamically determined, such as by an administering entity and/or the controller 302. One or more positionings can be aligned to maintain a narrow targeting of an individual surface 306 or to overlap airflow onto two or more surfaces 306.

In one or more embodiments, the controller 302 can modulate an airflow generator 320 between on and off states. In one or more other embodiments, more varied modulation can be employed, such as including two or more incremental airflow velocities and/or airflow patterns/shapes. In one or more embodiments, one or more of the airflow generators 320 can be movable, such as rotatable, pivotable and/or otherwise adjustable, such as via the controller 302, such as to maintain and/or generate one or more temperatures and/or ranges at one or more individual surfaces 306.

As indicated above, selectively varying individual surface temperatures at the one or more respective surfaces 306 can be controlled, by the controller 302 employing the one or more airflow generators 320. The control, such as via modulation of the one or more airflow generators 320 by the controller 302, can be facilitated to simulate one or more actual surface temperature ranges at the one or more surfaces 306. That is, relative to a single individual surface 306, control of the one or more airflow generators 320 by the controller 302 can be facilitated to provide, attempt to maintain and/or maintain one or more sequentially adjusted temperature ranges, referred to herein collectively as a temperature collective, at the single individual surface 306. This control can, accordingly, also be facilitated simultaneously for multiple surfaces of the vehicle object 304 in parallel. It will be appreciated that the controller 302 can employ distributed and/or federated machine intelligence, which can be employed to dynamically facilitate temperature control at the one or more surfaces 306 by employing any one or more modulations and/or adjustments of one or more airflow generators 320.

Figure 6:
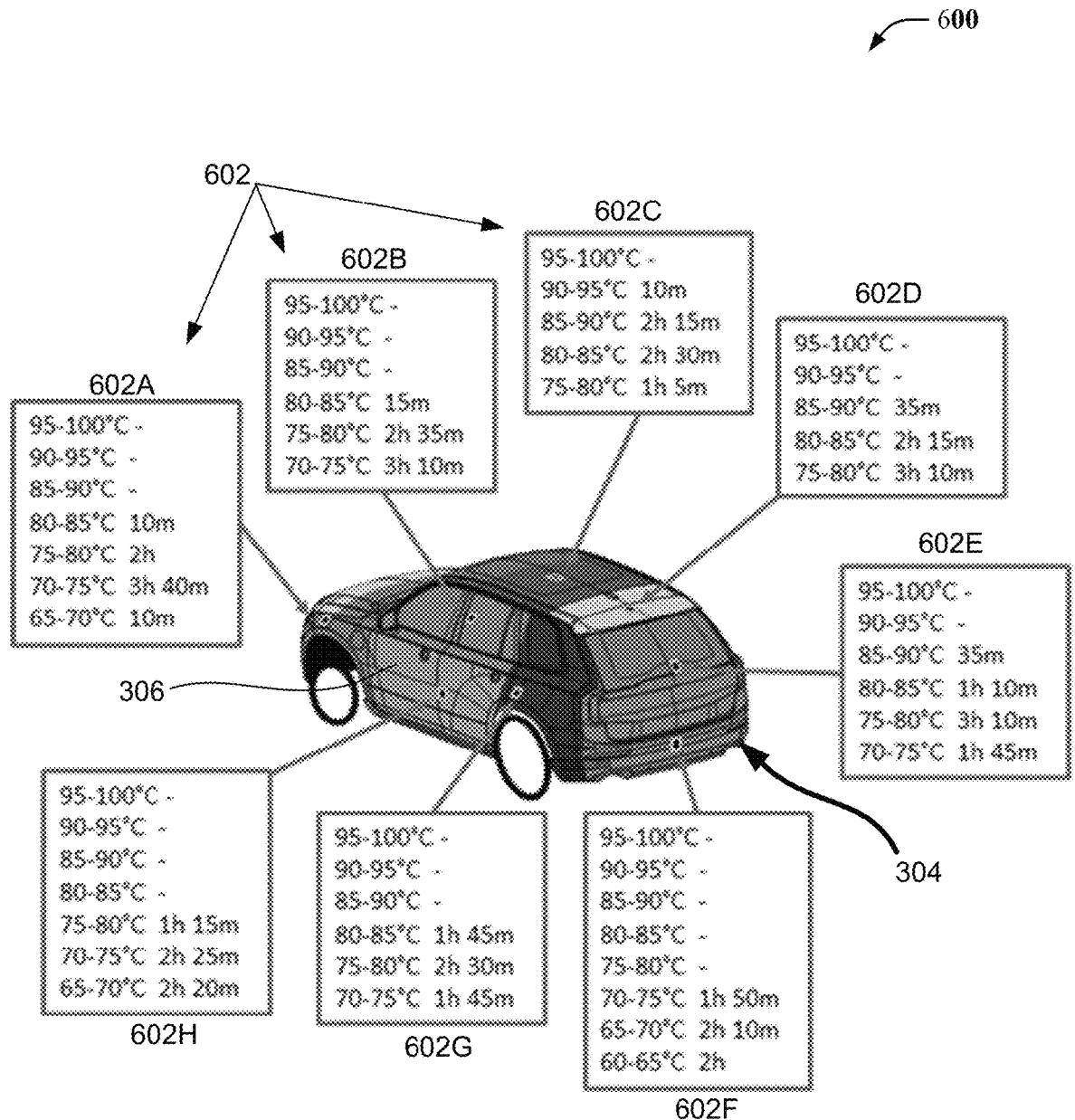
FIG. 6 illustrates an example, schematic illustration of the non-limiting system of FIG. 3 that can facilitate artificial weathering of an object, where the object is a vehicle, in accordance with one or more embodiments described herein.

Turning next to FIG. 6, one or more temperature collectives 602 are illustrated with respect to particular individual surfaces 306 of the vehicle object 304. For example, eight different temperature collectives 602A-602H are illustrated. In one or more embodiments, such temperature collectives represent highest measured actual surface temperature ranges that would be observed at the one or more surfaces 306 during one or more highest-radiation-load hours of one or more days in a non-artificial environment. Such temperatures observed can be automatically, equally and sequentially divided into 5 degree Celsius ranges. One or more ranges for each individual surface 306 can include related therewith a period of time. For each temperature collective, the total time can be equal, such as 6 hours. Such total period, such as the 6 hours can represent one cycle of artificial weathering to be completed by the non-limiting system 300. That is, temperatures actually observed over a period of time, such as over a full 24-hour day in an actual-use environment can be interpolated and/or compressed into a lesser set of time, such as the 6 hours, such as employing the controller 302, another computer and/or another processing unit. In this way, the temperature control for the individual surfaces 306, e.g., via the one or more airflow generators 320 and/or controller 302, can be based upon temperature readout from actual-use exposure, but in employing a considerably shorter time period. It will be appreciated that the actual-use data can be gathered employing same and/or similar temperature measurement devices, such as black standard thermometers.

Further, it will be appreciated that in an actual-use environment, due to a varied positioning of the vehicle object 304, one or more individual surfaces 306 can receive different radiation and/or observe different temperatures. Accordingly, in one or more embodiments, one or more temperature collectives can include a combination of interpolated and/or compressed data from exposure of the vehicle object 304 to varied positionings of the vehicle object 304, such as pointed towards N, S, E and/or W directions. That is, one or more temperature collectives can be based, e.g., by the controller 302, upon a sum of total light, radiation observed from various directional positionings of a vehicle object 304 relative to the changing position of the sun in the sky.

Moreover, such actual-use data, and thus data employed by the controller 302, can be based upon one location benchmark and/or a suitable combination thereof, such as Phoenix, Arizona and/or Córdoba, Spain.

Additionally and/or alternatively, in one or more embodiments, artificial weathering can be performed by the non-limiting system 300, such as employing the exemplary setup 500 based on a selectively determined program and/or test cycle. In one example, artificial weathering performed by the non-limiting system 300 can be employed over a 6-hour period employing temperature collectives such as the temperature collectives 602. In another example, artificial weathering performed by the non-limiting system 300 can be employed over a plurality of cycles, such as 8-hour cycles, where each 8-hour cycle includes the aforementioned 6-hour period followed by a 2-hour night period. During such night period of artificial weathering, ambient temperature of the chamber 502 can be lowered, radiation generated can be reduced and/or one or more individual surface temperatures can be controlled at one or more of the individual surfaces 306 based upon one or more temperatures, ranges and/or temperature collectives. As indicated above, such temperature control can be facilitated employing at least the test temperature measurement devices 330.

Figure 7:
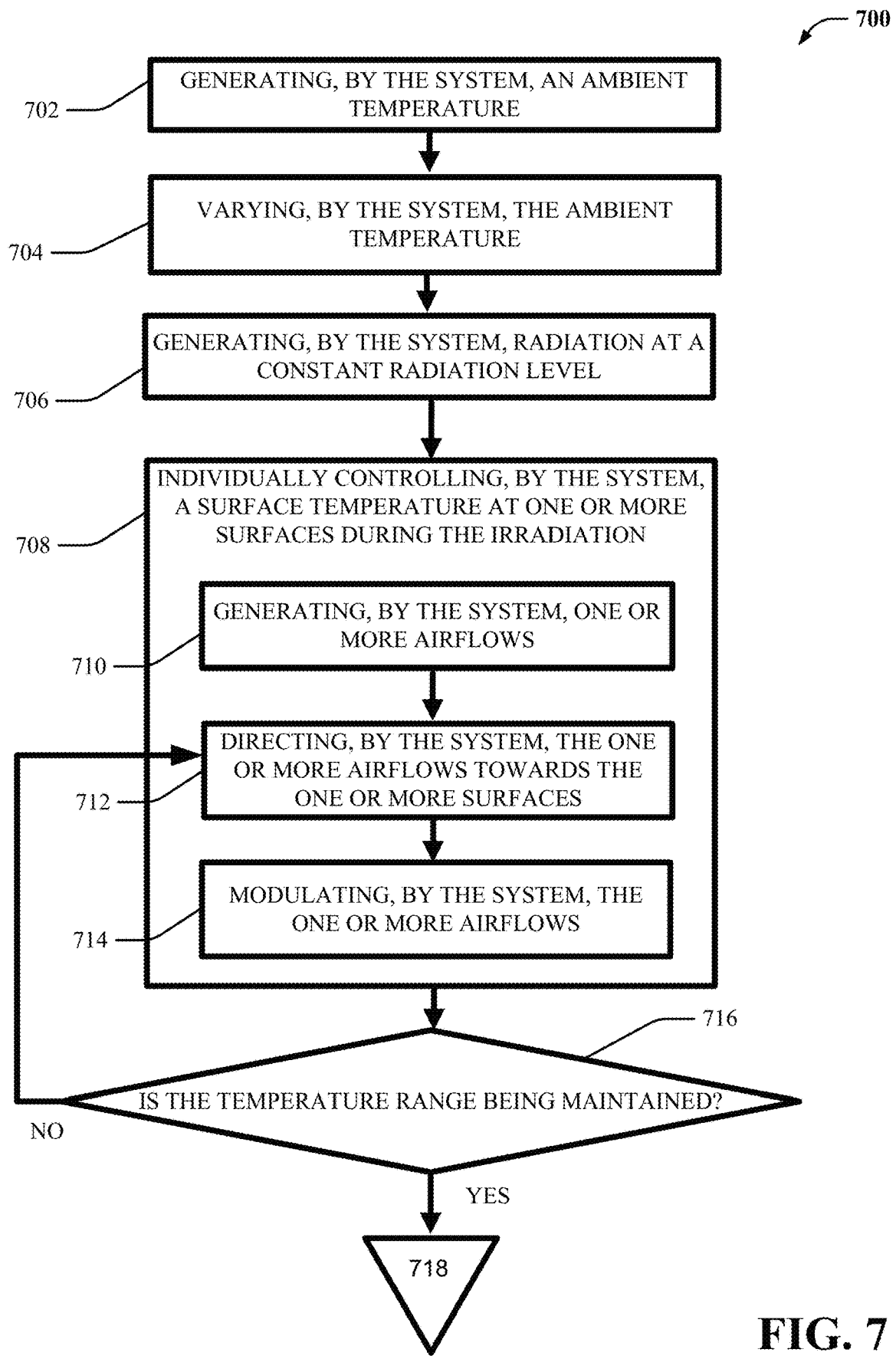
FIG. 7 illustrates a flow diagram of an example, non-limiting system-implemented method that can facilitate artificial weathering of an object, in accordance with one or more embodiments described herein.

Turning now to FIG. 7, illustrated is a flow diagram of an example, non-limiting system-implemented and/or computer-implemented method 700 that can facilitate artificial weathering of a multi-dimensional object (e.g., object 304), in accordance with one or more embodiments described herein. Repetitive description of like elements employed in other embodiments described herein is omitted for sake of brevity.

At 702, the system- and/or computer-implemented method 700 can comprise generating, by an artificial weathering system (e.g., via the controller 302 and/or ambient temperature generator 340 of the non-limiting system 300), an ambient temperature, such as at a testing chamber (e.g., chamber 502).

At 704, the system- and/or computer-implemented method 700 can comprise varying, by the artificial weathering system (e.g., controller 302 and/or ambient temperature generator 340), the ambient temperature, such as dynamically varying, according to the controller (e.g., controller 302) to better control the chamber environment.

At 706, the system- and/or computer-implemented method 700 can comprise generating, by the artificial weathering system (e.g., controller 302 and/or radiation generator 308), a constant radiation level (e.g., radiation 322).

At 708, the system- and/or computer-implemented method 700 can comprise individually controlling, by the artificial weathering system (e.g., controller 302 and/or airflow generator 320), a surface temperature at one or more surfaces (e.g., one or more surfaces 306) during the irradiation.

The individual controlling process of block 708 can include one or more of processes of blocks 710, 712 and 714.

At 710, the system- and/or computer-implemented method 700 can comprise generating, by the artificial weathering system (e.g., controller 302 and/or airflow generator 320), one or more airflows (e.g., one or more airflows 324).

At 712, the system- and/or computer-implemented method 700 can comprise directing, by the artificial weathering system (e.g., controller 302 and/or airflow generator 320), the one or more airflows (e.g., one or more airflows 324) towards the one or more surfaces (e.g., one or more surfaces 306).

At 714, the system- and/or computer-implemented method 700 can comprise modulating, by the artificial weathering system (e.g., controller 302 and/or airflow generator 320), the one or more airflows (e.g., one or more airflows 324), such as between an on state and an off state.

At 716, the system- and/or computer-implemented method 700 can comprise determining, by the artificial weathering system (e.g., controller 302 and/or test temperature measurement device 330), e.g., for one or more individual surfaces (e.g., surfaces 306) whether or not the instant temperature range (e.g., of a respective temperature collective 602) is being maintained.

Where the answer is no at block 716, the system-implemented method 700 can comprise continuing to perform the directing process of block 712 and/or the modulating process of block 714.

Where the answer is yes at block 716, the system-implemented method 700 can comprise moving on to continuation triangle 718. The continuation triangle 718 can represent a continuation of the system-implemented method 700 to FIG. 8.

Figure 8:
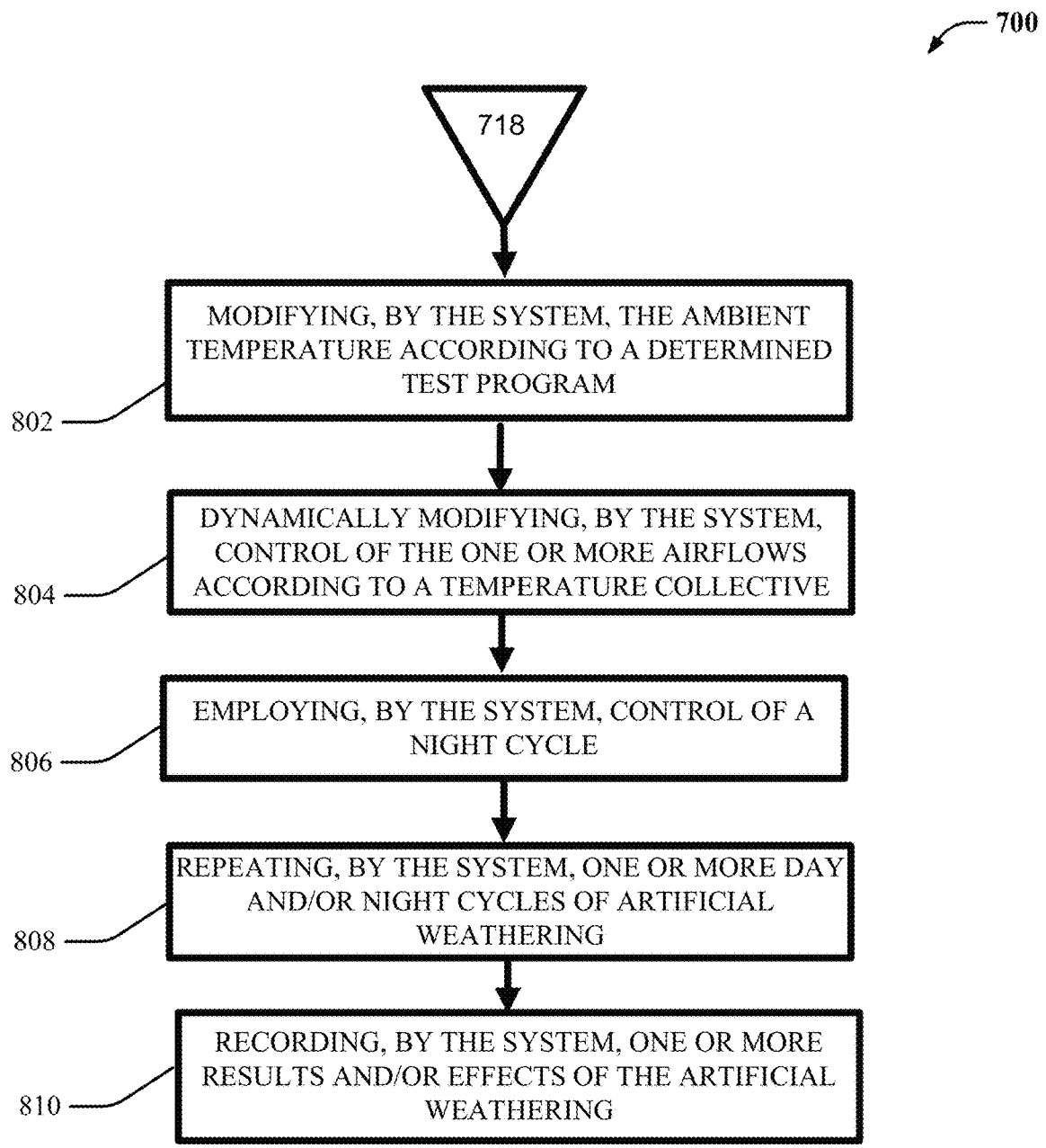
FIG. 8 illustrates another flow diagram continuing the example, non-limiting system-implemented method of FIG. 7, that can facilitate artificial weathering of an object, in accordance with one or more embodiments described herein.

Turning now to FIG. 8, the system-implemented method 700 is continued at the continuation triangle 718.

At 802, the system- and/or computer-implemented method 700 can comprise modifying, by the artificial weathering system (e.g., controller 302 and/or ambient temperature generator 340), the ambient temperature according to a determined test program, such as relative to a respective ambient temperature collective.

At 804, the system- and/or computer-implemented method 700 can comprise dynamically modifying, by the artificial weathering system (e.g., controller 302 and/or airflow generator 320), one or more airflows (e.g., one or more airflows 324) according to a temperature collective (e.g., temperature collective 602).

At 806, the system- and/or computer-implemented method 700 can comprise employing, by the artificial weathering system (e.g., controller 302), control of a night cycle. This process can include control of any one or more of an ambient temperature generator (e.g., ambient temperature generator 340), radiation generator (e.g., radiation generator 308) and/or airflow generator (e.g., airflow generator 320).

At 808, the system- and/or computer-implemented method 700 can comprise repeating, by the artificial weathering system (e.g., controller 302), one or more day and/or night cycles of artificial weathering, such as according to a determined test program. This process can include control of any one or more of an ambient temperature generator (e.g., ambient temperature generator 340), radiation generator (e.g., radiation generator 308) and/or airflow generator (e.g., airflow generator 320).

At 810, the system- and/or computer-implemented method 700 can comprise recording, by the artificial weathering system (e.g., controller 302 and/or ambient temperature generator 340), one or more results and/or effects of the artificial weathering at the one or more individual surfaces (e.g., one or more individual surfaces 306).

Turning now to any of the one or more embodiments discussed above with reference to any one or more of FIGS. 1 to 8, in view of the aforementioned descriptions, the one or more embodiments described herein are summarized. The one or more embodiments described herein can provide one or more of simultaneous multi-surface artificial weathering, individual control of artificial weathering at two or more surfaces, and/or artificial weathering closely correlating to weathering in an actual-use environment.

For example, individual control of artificial weathering at two or more surfaces can be provided by employing individual tracking of temperatures at individual surfaces during irradiation and by individually responding to these temperatures. Individual response can be provided such as employing a plurality of airflow generators with different airflow generators generating airflow directed toward different surfaces of the one or more surfaces. The one or more individual responses can enable individual control of the temperatures at the individual surfaces, in response to the temperature tracking.

In view of the one or more techniques employed by the one or more above-provided embodiments, accuracy of individual surface weathering results relative to one another can be improved (e.g., enhanced and/or optimized). This is because the one or more techniques can enable close correlation to actual-use individual surface weathering results. Individual responses targeted relative to individual surfaces, as opposed to globally (e.g., overall) altering radiation levels and/or ambient temperature, can enable individual weathering effects to artificially occur, which artificial effects can correlate to actual-use weather effects. That is, multiple surfaces of a multi-dimensional object to be simultaneously artificially weathered. Additionally and/or alternatively, in one or more embodiments, one or more supplementary interpolations of artificial weathering effects can be omitted, such as relative to one or more primary surfaces, to obtain final multi-surface artificial weathering results, where individual surface weather control is instead provided.

Indeed, the one or more artificial weathering techniques described herein can enable differentiated results that can better correlate to differentiated actual-use weathering at such individual surfaces. For example, in an actual-use environment, radiation received at a surface can typically be majoratively non-changing, in that our sun does not have on and off status. Nonetheless, radiation received can be varied and/or at least partially interrupted. That is, in one or more cases, a majority of radiation received in an outdoor environment can be due to direct exposure from the sun, with a lesser portion received indirectly from reflection, refraction and/or the like. Further, in one or more cases, while clouds and/or objects can vary an effect of radiation, such radiation can still be received. Accordingly, the non-limiting systems 100, 200 and/or 300 can provide differentiation to the artificial weathering at one or more individual surfaces that can correlate to actual use, such as by controlling the temperature at an individual surface, such as can naturally be affected such as by wind, clouds and/or other aspects.

The one or more flowcharts and/or block diagrams in the Figures illustrate the architecture, functionality and/or operation of one or more possible implementations of one or more systems, apparatuses and/or methods according to various embodiments described herein. In this regard, one or more blocks in the one or more flowcharts and/or block diagrams can represent a module, segment and/or portion of instructions, which can comprise one or more executable instructions for implementing the specified logical function(s). In one or more alternative implementations, one or more functions noted in one or more of the blocks can occur out of the order illustrated in the Figures. For example, one or more blocks shown in succession can be executed substantially concurrently and/or the one or more blocks can be executed in a reverse order as that illustrated, such as depending upon a functionality involved. It also will be noted that one or more blocks of the one or more flowcharts and/or block diagrams, and/or one or more combinations of one or more blocks thereof, can be implemented by a special purpose hardware-based system that can perform one or more of the specified functions and/or can carry out one or more special purpose hardware and/or computer instructions.

As indicated, one or more aspects are described herein with reference to one or more flowchart illustrations and/or block diagrams of one or more methods, apparatuses and/or systems according to one or more embodiments described herein. It will be understood that one or more blocks of the one or more flowcharts and/or block diagrams, and/or one or more combinations of blocks in the one or more flowcharts and/or block diagrams, can be implemented by one or more computer-readable program instructions.

The computer-readable program instructions can be provided to a processor of a general purpose computer, special purpose computer and/or other programmable data processing apparatus to produce a machine. For example, the instructions, which can execute via the processor of the computer and/or other programmable data-processing apparatus, can create one or more means for implementing the one or more functions and/or processes specified in the one or more flowchart and/or block diagram blocks. The computer-readable program instructions can be stored in a computer-readable storage medium that can direct a computer, programmable data processing apparatus and/or other device to function in a particular manner. For example, the computer-readable storage medium having instructions stored therein can comprise an article of manufacture including instructions that can implement one or more aspects of the one or more functions and/or processes specified in the one or more flowchart and/or block diagram blocks. The computer-readable program instructions can be loaded onto a computer, other programmable data processing apparatus and/or other device to cause one or more operational acts to be performed on the computer, other programmable apparatus and/or other device to produce a computer-implemented process. For example, the instructions that can execute on the computer, other programmable apparatus and/or other device can implement the one or more functions and/or processes specified in the one or more flowchart and/or block diagram blocks.

Figure 9:
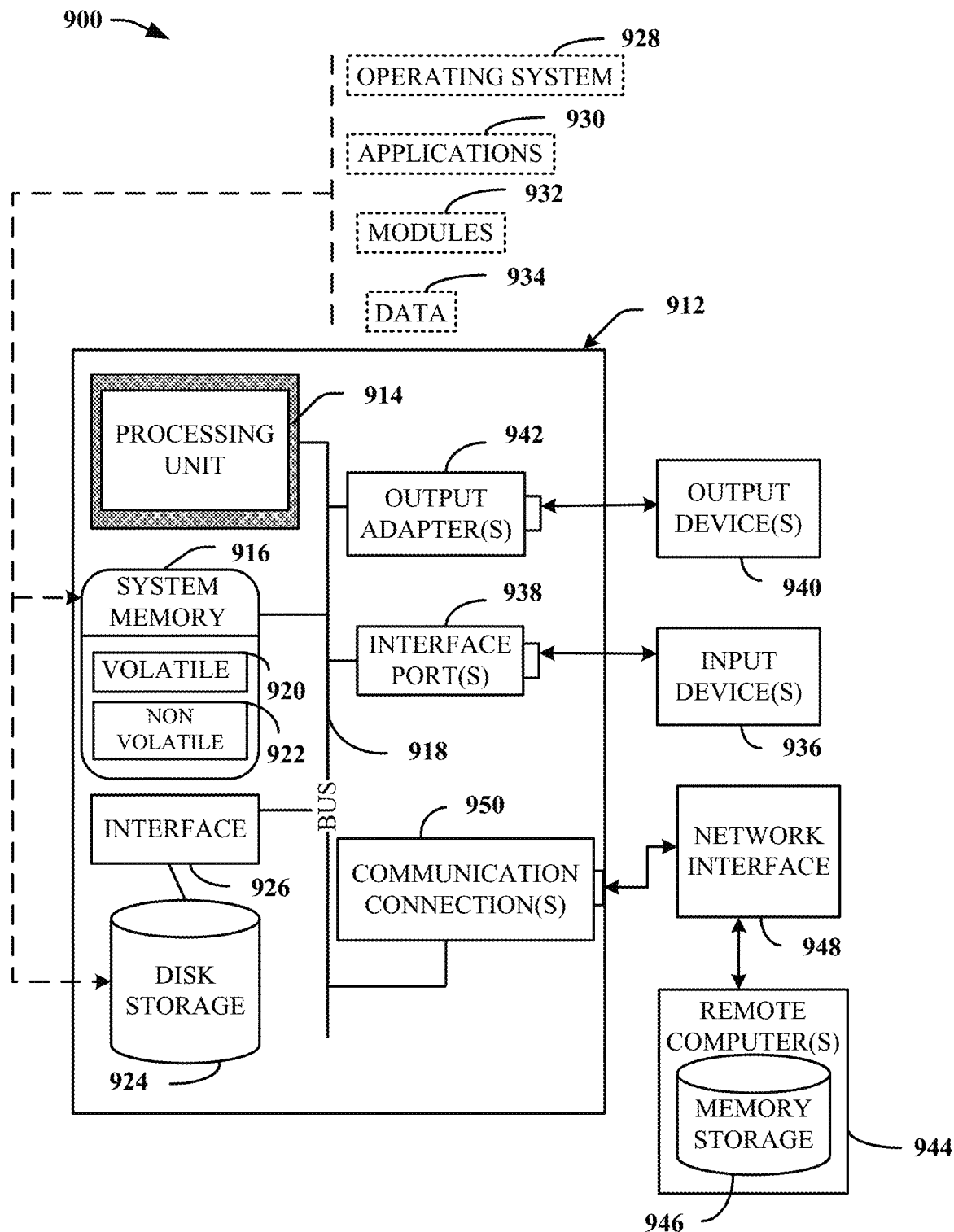
FIG. 9 illustrates a block diagram of an example, non-limiting operating environment, in which one or more embodiments described herein can be facilitated.

Next, in order to provide a context for the various aspects of the disclosed subject matter, FIG. 9 as well as the following discussion are intended to provide a general description of a suitable environment in which the various aspects of the disclosed subject matter can be implemented. FIG. 9 illustrates a suitable operating environment 900 for implementing various aspects described herein, which suitable operating environment 900 can include a computer 912. The computer 912 can also include a processing unit 914, a system memory 916 and a system bus 918. The system bus 918 can couple system components including, but not limited to, the system memory 916 to the processing unit 914. The processing unit 914 can be any of various available processors. Dual microprocessors and other multiprocessor architectures also can be employed as the processing unit 914. The system bus 918 can be any one or more types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 916 can also include volatile memory 920 and/or nonvolatile memory 922. The basic input/output system (BIOS), containing the basic routines to transfer information between elements within the computer 912, such as during start-up, can be stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 920 can also include random access memory (RAM), which acts as external cache memory. By way of illustration and not limitation, RAM can be available in one or more forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM.

Computer 912 can also include removable/non-removable, volatile/non-volatile computer storage media. FIG. 9 illustrates, for example, a disk storage 924. Disk storage 924 can include, but is not limited to, devices like a magnetic disk drive, floppy disk drive, tape drive, Jaz drive, Zip drive, LS-100 drive, flash memory card and/or memory stick. The disk storage 924 can include storage media separately and/or in combination with other storage media including, but not limited to, an optical disk drive such as a compact disk ROM device (CD-ROM), CD recordable drive (CD-R Drive), CD rewritable drive (CD-RW Drive) and/or a digital versatile disk ROM drive (DVD-ROM). To facilitate connection of the disk storage 924 to the system bus 918, a removable or non-removable interface is typically used, such as interface 926.

FIG. 9 also depicts software that can act as an intermediary between users and the basic computer resources described in the suitable operating environment 900. Such software can include, for example, an operating system 928. Operating system 928, which can be stored on disk storage 924, can act to control and allocate resources of the computer 912. System applications 930 can take advantage of the management of resources by operating system 928 through program modules 932 and/or program data 934, e.g., stored in system memory 916 and/or on disk storage 924. It is to be appreciated that one or more embodiments described herein can be implemented with various operating systems and/or combinations of operating systems.

A user can enter commands or information into the computer 912 through input device(s) 936. Input devices 936 can include, but are not limited to, a pointing device such as a mouse, trackball, stylus, touch pad, keyboard, microphone, joystick, game pad, satellite dish, scanner, TV tuner card, digital camera, digital video camera, web camera and/or the like. These and/or other input devices can connect to the processing unit 914 through the system bus 918 via interface port(s) 938. Interface port(s) 938 can include, for example, a serial port, a parallel port, a game port and/or a universal serial bus (USB). Output device(s) 940 can use one or more of the same type of ports as input device(s) 936. For example, a USB port can be used to provide input to computer 912 and/or to output information from computer 912 to an output device 940. Output adapter 942 can be provided to illustrate that there are one or more output devices 940 like monitors, speakers and/or printers, among other output devices 940, which can require special adapters. The output adapters 942 can include, by way of illustration and not limitation, video and/or sound cards that can provide a means of connection between the output device 940 and the system bus 918. It can be noted that other devices and/or systems of devices can provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor-based appliance, a peer device and/or other common network node and/or the like, and/or typically can also include many of the elements described relative to computer 912. For purposes of brevity, only a memory storage device 946 is illustrated with remote computer(s) 944. Remote computer(s) 944 can be logically connected to computer 912 through a network interface 948 and then physically connected via communication connection 950. Network interface 948 encompasses wired and/or wireless communication networks such as local-area networks (LAN), wide-area networks (WAN), cellular networks and/or the like. LAN technologies include Fiber Distributed Data Interface (FDDI), Copper Distributed Data Interface (CDDI), Ethernet, Token Ring and/or the like. WAN technologies can include, but are not limited to, point-to-point links, circuit switching networks like Integrated Services Digital Networks (ISDN) and/or variations thereon, packet switching networks and/or Digital Subscriber Lines (DSL). Communication connection(s) 950 refers to the hardware/software that can be employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and/or external technologies such as, modems including regular telephone grade modems, cable modems and DSL modems, ISDN adapters and/or Ethernet cards.

Figure 10:
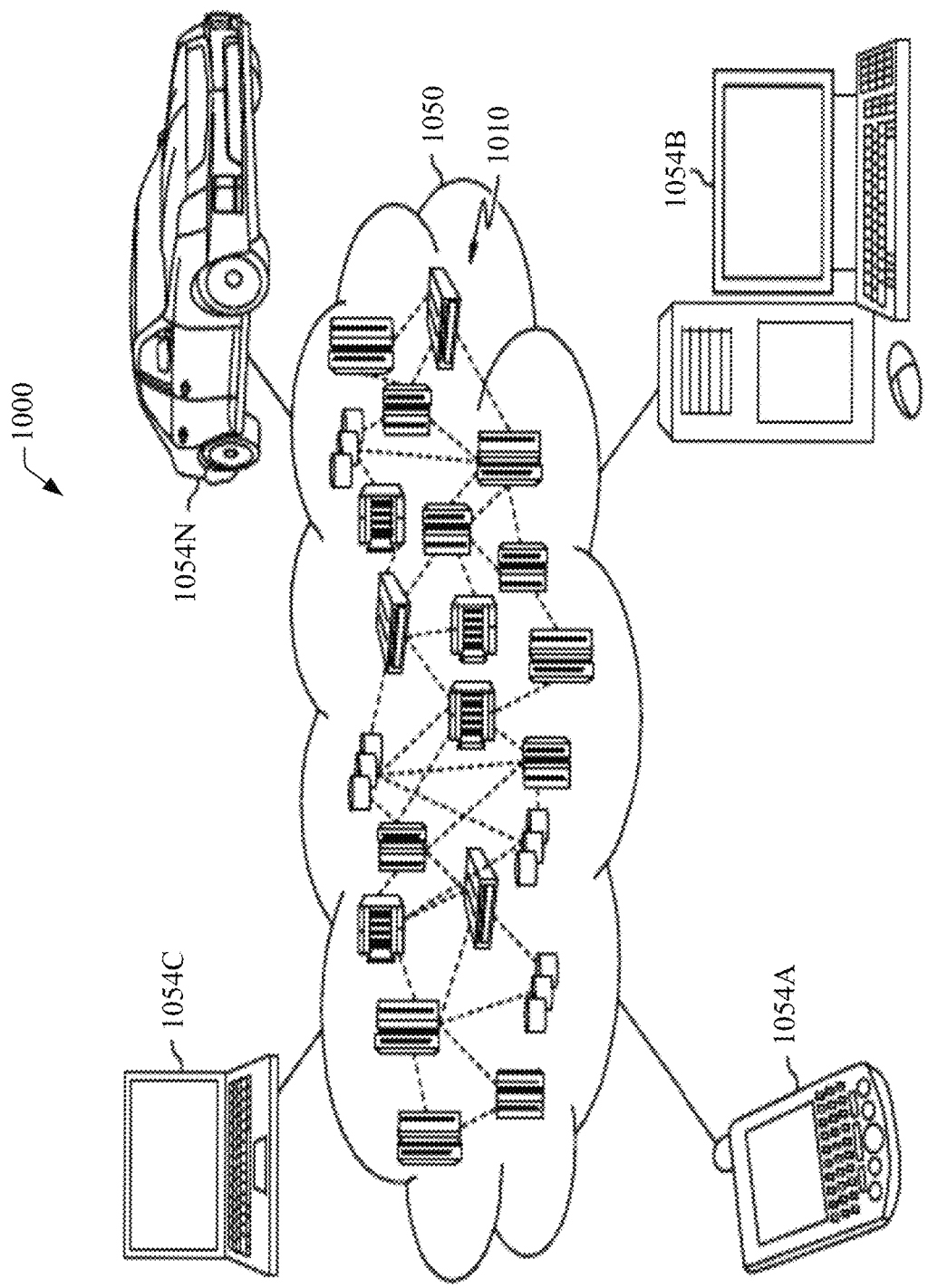
FIG. 10 illustrates a block diagram of an example, non-limiting cloud computing environment, in accordance with one or more embodiments described herein.
Figure 11:
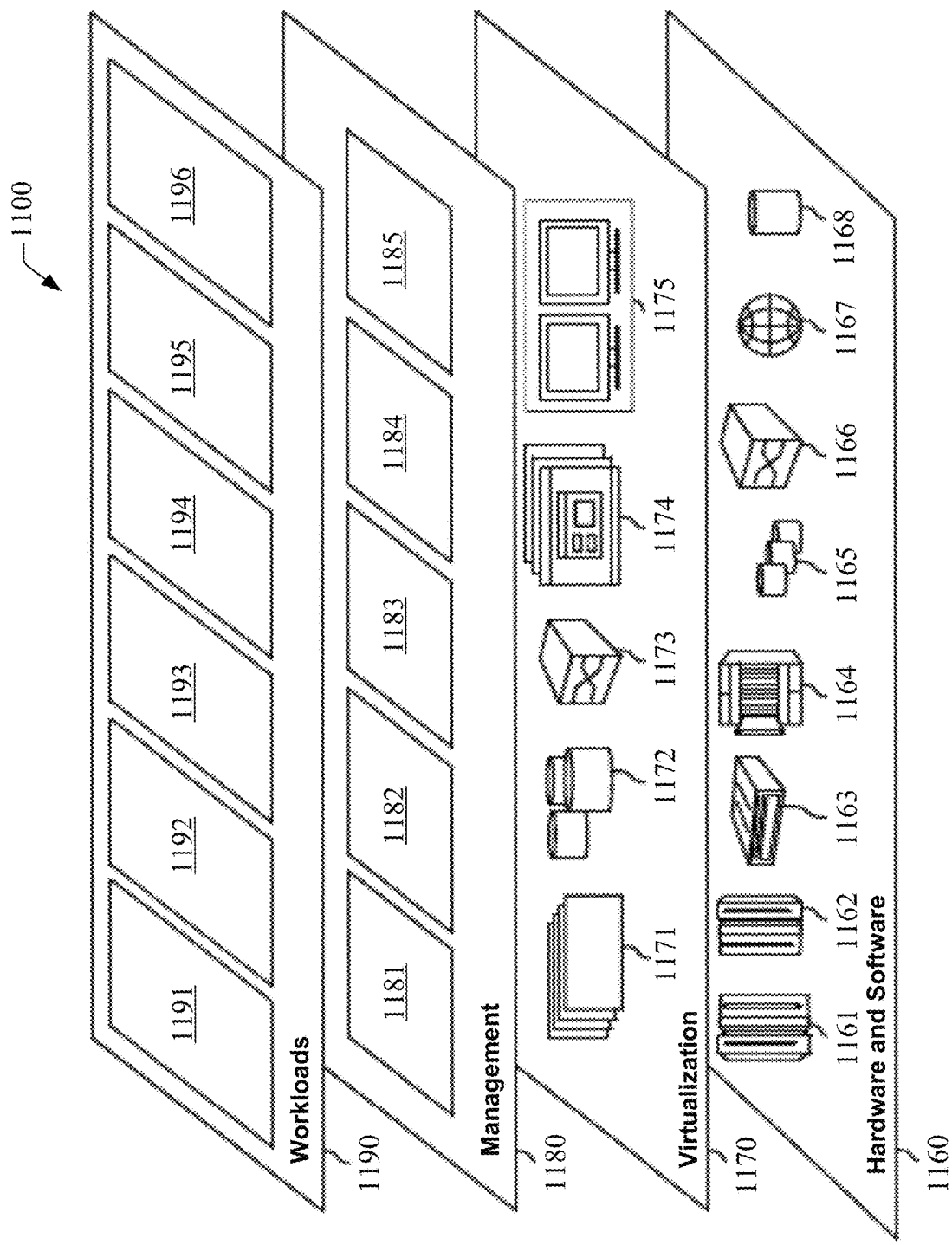
FIG. 11 illustrates a block diagram of a plurality of example, non-limiting abstraction model layers, in accordance with one or more embodiments described herein.

In one or more cases, the various embodiments of the non-limiting systems 100, 200 and/or 300 described herein can be associated with a cloud computing environment, such as a cloud computing environment 1050 as is illustrated in FIG. 10 and/or with one or more functional abstraction layers described herein with reference to FIG. 11 (e.g., hardware and software layer 1160, virtualization layer 1170, management layer 1180 and/or workloads layer 1190).

It is to be understood that although a detailed description is provided herein on cloud computing, implementation of the teachings recited herein are not limited to a cloud computing environment. Rather, one or more embodiments described herein can be capable of being implemented in conjunction with any other type of computing environment now known or later developed.

Regarding cloud computing, cloud computing can be a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and/or at least four deployment models.

Characteristics can be as follows:

On-demand self-service: a cloud consumer can unilaterally provision computing capabilities, such as server time and network storage, as needed automatically without requiring human interaction with the service's provider.

Broad network access: capabilities can be available over a network and accessed through standard mechanisms that promote use by heterogeneous thin or thick client platforms (e.g., mobile phones, laptops, and PDAs).

Resource pooling: the providers computing resources can be pooled to serve multiple consumers using a multi-tenant model, with different physical and virtual resources dynamically assigned and reassigned according to demand. There can be a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in one or more cases automatically, to quickly scale out and rapidly released to quickly scale in. To the consumer, the capabilities available for provisioning can appear to be unlimited and can be purchased in any quantity at any time.

Measured service: cloud systems can automatically control and/or optimize resource use by leveraging a metering capability at one or more levels of abstraction appropriate to the type of service (e.g., storage, processing, bandwidth and/or active user accounts). Resource usage can be monitored, controlled and/or reported, providing transparency for both the provider and consumer of the utilized service.

Service Models can be as follows:

Software as a Service (SaaS): the capability provided to the consumer can be to use the provider's applications running on a cloud infrastructure. The applications can be accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer can be to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer can be to provision processing, storage, networks, and other fundamental computing resources where the consumer can deploy and run arbitrary software, which can include operating systems and applications. The consumer does not manage or control the underlying cloud infrastructure but can have control over operating systems, storage, deployed applications, and/or possibly limited control of select networking components (e.g., host firewalls).

Deployment Models can be as follows:

Private cloud: the cloud infrastructure can be operated solely for an organization. It can be managed by the organization and/or a third party and can exist on-premises and/or off-premises.

Community cloud: the cloud infrastructure can be shared by one or more organizations and can support a specific community that can have shared concerns (e.g., mission, security requirements, policy, and compliance considerations). The cloud infrastructure can be managed by the organizations and/or by a third party and/or can exist on-premises and/or off-premises.

Public cloud: the cloud infrastructure can be made available to the general public and/or to a large industry group and/or can be owned by an organization selling cloud services.

Hybrid cloud: the cloud infrastructure can be a composition of two or more clouds (private, community and/or public) that can remain as unique entities but can be bound together by standardized and/or proprietary technology that enables data and application portability (e.g., cloud bursting for load-balancing between clouds).

A cloud computing environment can be service oriented with a focus on statelessness, low coupling, modularity and/or semantic interoperability. At the heart of cloud computing can be an infrastructure that can include a network of interconnected nodes.

Referring now specifically to FIG. 10, an illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C and/or automobile computer system 1054N can communicate. Although not illustrated in FIG. 10, cloud computing nodes 1010 can further comprise a quantum platform (e.g., quantum computer, quantum hardware, quantum software and/or another quantum platform) with which local computing devices used by cloud consumers can communicate. Nodes 1010 can communicate with one another. Nodes 1010 can be grouped (not shown) physically and/or virtually, in one or more networks, such as Private, Community, Public and/or Hybrid clouds as described hereinabove, and/or a combination thereof. This grouping can allow cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and/or cloud computing environment 1050 can communicate with any type of computerized device over any type of network and/or network addressable connection (e.g., using a web browser).

Referring next specifically to FIG. 11, a set of functional abstraction layers provided by cloud computing environment 1050 (FIG. 10) is shown. It should be understood in advance that the components, layers and/or functions shown in FIG. 11 are intended to be illustrative only and that the one or more embodiments described herein are not limited thereto. As depicted, the following layers and/or corresponding functions are provided:

Hardware and software layer 1160 can include hardware and software components. Examples of hardware components can include mainframes 1161; RISC (Reduced Instruction Set Computer) architecture based servers 1162; servers 1163; blade servers 1164; storage devices 1165; and/or networks and networking components 1166. In one or more embodiments, software components can include network application server software 1167, database software 1168, quantum platform routing software (not illustrated in FIG. 11), and/or quantum software (not illustrated in FIG. 11).

Virtualization layer 1170 can provide an abstraction layer from which the following examples of virtual entities can be provided: virtual servers 1171; virtual storage 1172; virtual networks 1173, including virtual private networks; virtual applications and operating systems 1174; and/or virtual clients 1175.

In one example, management layer 1180 can provide the functions described below. Resource provisioning 1181 can provide dynamic procurement of computing resources and/or other resources that can be utilized to perform tasks within the cloud computing environment. Metering and pricing 1182 can provide cost tracking as resources are utilized within the cloud computing environment, and/or billing and/or invoicing for consumption of these resources. In one example, these resources can include application software licenses. Security can provide identity verification for cloud consumers and tasks, as well as protection for data and other resources. User portal 1183 can provide access to the cloud computing environment for consumers and system administrators. Service level management 1184 can provide cloud computing resource allocation and management such that required service levels are met. Service Level Agreement (SLA) planning and fulfillment 1185 can pre-arrangement for, and procurement of, cloud computing resources for which a future requirement is anticipated in accordance with an SLA.

Workloads layer 1190 can provide one or more examples of functionality for which the cloud computing environment 1050 (FIG. 10) can be utilized. Non-limiting examples of workloads and/or functions which can be provided from this layer can include: mapping and navigation 1191; software development and lifecycle management 1192; virtual classroom education delivery 1193; data analytics processing 1194; transaction processing 1195; and/or vulnerability risk assessment software 1196.

The one or more embodiments described herein can include on or more of a system, a method, an apparatus and/or a computer program product at any possible technical detail level of integration. The computer program product can include a computer readable storage medium (or media) having computer readable program instructions thereon for causing a processor to carry out one or more aspects of the one or more embodiment described herein. The computer readable storage medium can be a tangible device that can retain and/or store instructions for use by an instruction execution device. The computer readable storage medium can be, for example, but is not limited to, an electronic storage device, a magnetic storage device, an optical storage device, an electromagnetic storage device, a semiconductor storage device and/or any suitable combination of the foregoing. A non-exhaustive list of more particular examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card and/or network interface in one or more computing/processing devices can receive computer readable program instructions from the network and/or forward the computer readable program instructions for storage in a computer readable storage medium within the respective computing/processing device.

Computer readable program instructions for carrying out one or more operations of the one or more embodiments described herein can be assembler instructions, instruction-set-architecture (ISA) instructions, machine instructions, machine dependent instructions, microcode, firmware instructions, state-setting data, configuration data for integrated circuitry, and/or either source code or object code written in any combination of one or more programming languages, including an object oriented programming language such as Smalltalk, C++, or the like, and/or procedural programming languages, such as the "C" programming language and/or similar programming languages. The computer readable program instructions can execute entirely on the user's computer, partly on the user's computer, as a stand-alone software package, partly on the user's computer and partly on a remote computer and/or entirely on the remote computer and/or server. In the latter scenario, the remote computer can be connected to the user's computer through any type of network, including a local area network (LAN) and/or a wide area network (WAN), and/or the connection can be made to an external computer (for example, through the Internet using an Internet Service Provider). In one or more embodiments, electronic circuitry including, for example, one or more programmable logic circuitry, field-programmable gate arrays (FPGA) and/or programmable logic arrays (PLA) can execute the computer readable program instructions by utilizing state information of the computer readable program instructions to personalize the electronic circuitry, in order to perform one or more aspects of the one or more embodiments described herein.

Those skilled in the art will recognize that one or more embodiments described herein can or can be implemented in combination with one or more program modules. Generally, program modules can include routines, programs, components and/or data structures that can perform particular tasks and/or implement particular abstract data types. Moreover, those skilled in the art will appreciate that the computer-implemented and/or system-implemented methods described herein can be practiced with other computer system configurations, including single-processor and/or multiprocessor computer systems, mini-computing devices, and/or mainframe computers, as well as computers, hand-held computing devices (e.g., PDA, phone), microprocessor-based and/or programmable consumer and/or industrial electronics, and/or the like.

The illustrated aspects can also be practiced in one or more distributed computing environments in which tasks can be performed by remote processing devices that are linked through a communications network. However, one or more, if not all aspects described herein can be practiced on one or more stand-alone computers.

In a distributed computing environment, program modules can be located in both local and remote memory storage devices. For example, in one or more embodiments, computer executable components can be executed from memory that can include and/or be comprised of one or more distributed memory units. As used herein, the term "memory" and "memory unit" are interchangeable. Further, one or more embodiments described herein can execute code of the computer executable components in a distributed manner, e.g., multiple processors combining and/or working cooperatively to execute code from one or more distributed memory units. As used herein, the term "memory" can encompass a single memory and/or memory unit at one location and/or multiple memories and/or memory units at one or more locations.

As used herein, the terms "component," "system," "platform," "interface," and the like, can refer to and/or can include a computer-related entity and/or an entity related to an operational machine with one or more specific functionalities. One or more such entities disclosed herein can be hardware, a combination of hardware and software, software, and/or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric and/or electronic circuitry, which can be operated by a software and/or firmware application executed by a processor. In such a case, the processor can be internal and/or external to the apparatus and/or can execute at least a part of the software and/or firmware application. As yet another example, a component can be an apparatus that provides specific functionality through electronic components without mechanical parts, wherein the electronic components can include a processor and/or other means to execute software and/or firmware that confers at least in part the functionality of the electronic components. In an aspect, a component can emulate an electronic component via a virtual machine, e.g., within a cloud computing system.

As used herein, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a graphics processing unit (GPU), a field programmable gate array (FPGA), a programmable logic controller (PLC), a complex programmable logic device (CPLD), a discrete gate or transistor logic, discrete hardware components, and/or any combination thereof designed to perform the functions described herein. Further, one or more processors can exploit nano-scale architectures such as, but not limited to, molecular and/or quantum-dot based transistors, switches and/or gates, in order to optimize space usage and/or to enhance performance of user equipment. A processor can also be implemented as a combination of computing processing units.

As used herein, terms such as "store," "storage," "data store," data storage," "database," and substantially any other information storage component relevant to operation and/or functionality of a component are utilized to refer to "memory components," entities embodied in a "memory," and/or components comprising a memory. It is to be appreciated that memory and/or memory components described herein can be volatile memory and/or nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM can be available in one or more forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and/or Rambus dynamic RAM (RDRAM). Additionally, the disclosed memory components of systems, system-implemented methods and/or computer-implemented methods described herein are intended to include, without being limited to including, these and/or any other suitable types of memory.

What has been described herein includes one or more mere examples of one or more systems and/or methods. It is, of course, not possible to describe every conceivable combination of components and/or system-implemented methods for purposes of describing the subject matter. Nonetheless, one of ordinary skill in the art can recognize that one or more further combinations and/or permutations of the disclosed subject matter are possible. Furthermore, to the extent that the terms "includes", "has", "possesses" and/or the like are used in the detailed description, claims, appendices and/or drawings, such terms are intended to be inclusive in a manner similar to the term "comprising" as "comprising" is interpreted when employed as a transitional word in a claim.

It will be understood that when an element is referred to as being "coupled" to another element, the term "coupled" can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling and/or another type of coupling.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance and/or illustration. For the avoidance of doubt, the subject matter disclosed herein is not limited by such examples. In addition, any aspect and/or design described herein as an "example" and/or "exemplary" is not necessarily to be construed as preferred and/or advantageous over other aspects or designs, nor is any aspect and/or design meant to preclude equivalent exemplary structures and/or techniques known to those of ordinary skill in the art.

The description of the one or more embodiments provided herein has been presented for purposes of illustration but is not intended to be exhaustive and/or limited to the one or more embodiments disclosed. One or more modifications and/or variations will be apparent to those of ordinary skill in the art without departing from the scope and/or spirit of the described embodiments. The terminology used herein was chosen to best explain the principles of the embodiments, practical application and/or technical improvement over technologies found in the marketplace, and/or to enable others of ordinary skill in the art to understand the one or more embodiments disclosed herein.

What is claimed is:

1. An artificial weathering system comprising:
   a radiation generator configured to apply a constant radiation level to a plurality of exterior surfaces of an object; and
   a controller configured to individually control, by adjusting respective airflows of a plurality of airflow generators, respective surface temperatures at the plurality of exterior surfaces during the irradiation, wherein at least two of the respective surface temperatures at the plurality of exterior surfaces are different, and wherein the adjusting the respective airflows comprising adjusting respective shapes of the respective airflows.

2. The artificial weathering system of claim 1, wherein the radiation generator further is configured to simultaneously apply the constant radiation level to the plurality of exterior surfaces.

3. The artificial weathering system of claim 1,
wherein the controller further is configured to simultaneously individually control the respective surface temperatures at two or more of the plurality of exterior surfaces.

4. The artificial weathering system of claim 1, further comprising:
respective temperature sensors disposed at the plurality of exterior surfaces and communicatively connected to the controller.

5. The artificial weathering system of claim 1,
wherein the respective surface temperatures at the plurality of exterior surfaces are controlled to simulate respective actual surface temperature ranges that would be observed at the plurality of exterior surfaces during one or more highest-radiation-load hours of one or more days in a non-artificial environment.

6. The artificial weathering system of claim 1,
wherein the controller further is configured to maintain an ambient temperature range, that would be observed in a non-artificial environment, of a chamber containing the object during the irradiation of the plurality of exterior surfaces.

7. A method of employing an artificial weathering system to artificially weather an object, the method comprising:
applying, by the system, a constant radiation level to a plurality of exterior surfaces of an object; and
individually controlling, by the system, by adjusting respective airflows of a plurality of airflow generators, respective surface temperatures at the plurality of exterior surfaces during the irradiation, wherein at least two of the respective surface temperatures at the plurality of exterior surfaces are different, and wherein the adjusting the respective airflows comprising adjusting respective shapes of the respective airflows.

8. The method of claim 7, further comprising:
simultaneously applying, by the system, the constant radiation level to the plurality of exterior surfaces.

9. The method of claim 7, wherein the individually controlling comprises:
simultaneously individually controlling the respective surface temperatures at two or more of the plurality of exterior surfaces.

10. The method of claim 7, further comprising:
measuring, by the system, the respective surface temperatures at the plurality of exterior surfaces using respective temperature sensors at the plurality of exterior surfaces.

11. The method of claim 7, wherein the individually controlling comprises:
controlling the respective surface temperatures at the plurality of exterior surfaces to simulate respective actual surface temperature ranges observed at the plurality of exterior surfaces during one or more highest-radiation-load hours in a non-artificial environment.

12. The method of claim 7, further comprising:
maintaining, by the system, an ambient temperature range, that would be observed in a non-artificial environment, of a chamber containing the object during the irradiation of the plurality of exterior surfaces.

13. The method of claim 7, wherein the applying the constant radiation level comprises:
uniformly applying the constant radiation level over the plurality of exterior surfaces.

14. A non-transitory computer-readable medium having instructions stored thereon that, in response to execution, cause a system comprising a processor to perform operations comprising:
applying a constant radiation level to a plurality of exterior surfaces of an object; and
individually controlling, by adjusting respective airflows of a plurality of airflow generators, respective surface temperatures at the plurality of exterior surfaces during the irradiation, wherein at least two of the respective surface temperatures at the plurality of exterior surfaces are different, and wherein the adjusting the respective airflows comprising adjusting respective shapes of the respective airflows.

15. The non-transitory computer-readable medium of claim 14, wherein the operations further comprise:
simultaneously applying, by the system, the constant radiation level to the plurality of exterior surfaces.

16. The non-transitory computer-readable medium of claim 14, wherein the individually controlling comprises:
simultaneously individually controlling-the respective surface temperatures at two or more of the plurality of exterior surfaces.

17. The non-transitory computer-readable medium of claim 14, wherein the operations further comprise:
measuring, by the system, the respective surface temperatures at the plurality of exterior surfaces using respective temperature sensors at the plurality of exterior surfaces.

18. The non-transitory computer-readable medium of claim 14, wherein the individually controlling comprises:
controlling the respective surface temperatures at the plurality exterior surfaces to simulate respective actual surface temperature ranges observed at the plurality of exterior surfaces during one or more highest-radiation-load hours in a non-artificial environment.

19. The non-transitory computer-readable medium of claim 14, wherein the operations further comprise:
maintaining an ambient temperature range, that would be observed in a non-artificial environment, of a chamber containing the object during the irradiation of the plurality of exterior surfaces.

20. The non-transitory computer-readable medium of claim 14, wherein the applying the constant radiation level comprises:
uniformly applying the constant radiation level over the plurality of exterior surfaces.

* * * * *